United States Patent
Agiwal

(10) Patent No.: US 12,349,131 B2
(45) Date of Patent: Jul. 1, 2025

(54) SYSTEM AND METHOD OF TRANSMITTING AND RECEIVING SYSTEM INFORMATION BY REDUCED CAPABILITY UES

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 17/953,830

(22) Filed: Sep. 27, 2022

(65) Prior Publication Data

US 2023/0095857 A1 Mar. 30, 2023

(30) Foreign Application Priority Data

Sep. 27, 2021 (KR) .................... 10-2021-0127463

(51) Int. Cl.
*H04W 72/1268* (2023.01)
*H04W 72/23* (2023.01)
*H04W 72/51* (2023.01)

(52) U.S. Cl.
CPC ....... *H04W 72/1268* (2013.01); *H04W 72/23* (2023.01); *H04W 72/51* (2023.01)

(58) Field of Classification Search
CPC . H04W 48/12; H04W 48/14; H04W 72/0457; H04W 72/1268; H04W 72/23;
(Continued)

(56) References Cited

U.S. PATENT DOCUMENTS 10,492,227 B2 * 11/2019 Moon .................. H04W 4/70
10,505,799 B2 * 12/2019 Mallick ................ H04L 5/0053
(Continued)

FOREIGN PATENT DOCUMENTS

CA       3109172 A1 *  8/2021   .......... H04B 17/318
CN    113678564 A  * 11/2021   .......... H04B 17/318
(Continued)

OTHER PUBLICATIONS

OPPO, Other considerations for reduced UE capability, R1-2008264, 3GPP TSG RAN WG1 #103-e, e-Meeting, Nov. 1, 2020.
(Continued)

*Primary Examiner* — Eric Nowlin
(74) *Attorney, Agent, or Firm* — Jefferson IP Law, LLP

(57) ABSTRACT

A method performed by a reduced capability user equipment (redcap UE) in a wireless communication system is provided. The method includes acquiring a system information block 1 (SIB1) including information on a first initial uplink bandwidth part (BWP) on a normal uplink (NUL) carrier, identifying whether the SIB1 includes first configuration information used for the redcap UE to request a system information (SI) message, identifying whether a second initial uplink BWP for the redcap UE is configured on the NUL carrier based on the SIB1, in a case that the SIB1 includes the first configuration information for the redcap UE, the second initial uplink BWP for the redcap UE is configured, and criteria to select the NUL carrier is met, starting a random access procedure for requesting the SI message in the second initial uplink BWP for the redcap UE on the NUL carrier, based on a preamble resource in the first configuration information, and acquiring the requested SI message.

8 Claims, 9 Drawing Sheets

(58) Field of Classification Search
CPC . H04W 72/51; H04W 72/542; H04W 74/004; H04W 74/0833
See application file for complete search history.

(56) References Cited

U.S. PATENT DOCUMENTS

| | | | | |
|---|---|---|---|---|
| 10,602,535 | B2* | 3/2020 | Noh | H04W 72/30 |
| 11,191,080 | B2* | 11/2021 | Agiwal | H04W 76/15 |
| 11,375,528 | B2* | 6/2022 | Noh | H03M 13/2906 |
| 11,496,359 | B2* | 11/2022 | Basu Mallick | H04L 5/0091 |
| 11,523,436 | B2* | 12/2022 | Ingale | H04W 48/02 |
| 11,659,600 | B2* | 5/2023 | Cozzo | H04L 1/08 370/328 |
| 11,736,986 | B2* | 8/2023 | Kung | H04W 36/0005 370/331 |
| 11,812,369 | B2* | 11/2023 | Park | H04W 74/0833 |
| 12,096,447 | B2* | 9/2024 | Zhang | H04L 5/0094 |
| 12,127,176 | B2* | 10/2024 | He | H04L 5/0094 |
| 2018/0263053 | A1* | 9/2018 | Moon | H04W 74/0833 |
| 2018/0270115 | A1* | 9/2018 | Mallick | H04L 5/0091 |
| 2019/0166611 | A1* | 5/2019 | Noh | H04W 72/1273 |
| 2019/0342165 | A1* | 11/2019 | Basu Mallick | H04L 5/0053 |
| 2020/0084708 | A1 | 3/2020 | Ingale et al. | |
| 2020/0170020 | A1* | 5/2020 | Agiwal | H04W 72/542 |
| 2020/0196338 | A1* | 6/2020 | Noh | H04W 72/1273 |
| 2020/0266959 | A1 | 8/2020 | Yi et al. | |
| 2020/0275494 | A1* | 8/2020 | Ingale | H04W 48/02 |
| 2021/0105852 | A1 | 4/2021 | Shih et al. | |
| 2021/0258865 | A1* | 8/2021 | Park | H04W 48/16 |
| 2021/0274483 | A1* | 9/2021 | Zhang | H04L 5/1469 |
| 2021/0274554 | A1* | 9/2021 | Cozzo | H04W 74/0833 |
| 2022/0007425 | A1* | 1/2022 | Jia | H04L 5/001 |
| 2022/0022250 | A1* | 1/2022 | Cirik | H04W 72/542 |
| 2022/0377798 | A1* | 11/2022 | Chien | H04L 1/1812 |
| 2023/0076781 | A1* | 3/2023 | Kim | H04W 48/02 |
| 2023/0095857 | A1* | 3/2023 | Agiwal | H04W 72/1268 370/329 |
| 2023/0180273 | A1* | 6/2023 | Lu | H04L 1/1854 |
| 2023/0188261 | A1* | 6/2023 | Awadin | H04L 1/08 370/329 |
| 2023/0189308 | A1* | 6/2023 | Choi | H04L 1/1896 |
| 2023/0269712 | A1* | 8/2023 | He | H04L 5/001 370/329 |
| 2023/0319841 | A1* | 10/2023 | Ratasuk | H04L 1/0063 370/329 |
| 2023/0379802 | A1* | 11/2023 | Bhatoolaul | H04W 48/12 |
| 2023/0422296 | A1* | 12/2023 | Feng | H04W 74/02 |
| 2024/0031056 | A1* | 1/2024 | Rastegardoost | H04W 74/0833 |
| 2024/0080902 | A1* | 3/2024 | Dai | H04W 74/08 |
| 2024/0381230 | A1* | 11/2024 | Agiwal | H04W 48/12 |
| 2024/0407016 | A1* | 12/2024 | Elkourdi | H04W 74/0833 |
| 2025/0048375 | A1* | 2/2025 | Zhang | H04L 5/1469 |

FOREIGN PATENT DOCUMENTS

| | | | | |
|---|---|---|---|---|
| CN | 114342496 A | * | 4/2022 | |
| CN | 115152310 A | * | 10/2022 | H04L 1/08 |
| CN | 115529855 A | * | 12/2022 | H04B 1/7136 |
| CN | 116097837 A | * | 5/2023 | H04L 1/1854 |
| CN | 114342496 B | * | 10/2024 | |
| EP | 3512137 A1 | * | 7/2019 | H03M 13/13 |
| EP | 3866548 A1 | * | 8/2021 | H04B 17/318 |
| EP | 3883315 A1 | * | 9/2021 | H04B 7/0413 |
| EP | 3512137 B1 | * | 10/2021 | H03M 13/13 |
| EP | 3858010 B1 | * | 6/2022 | H04W 74/004 |
| EP | 3602922 B1 | * | 2/2023 | H04L 41/0813 |
| EP | 4184851 A1 | * | 5/2023 | H04L 41/0813 |
| EP | 4280791 A1 | * | 11/2023 | H04L 5/00 |
| EP | 3883315 B1 | * | 6/2024 | H04B 7/0413 |
| EP | 4462717 A2 | * | 11/2024 | H04B 7/0413 |
| JP | 2023536295 A | * | 8/2023 | |
| JP | 7456551 B2 | * | 3/2024 | H04L 1/1854 |
| KR | 20210119568 A | * | 10/2021 | |
| KR | 102487886 B1 | * | 1/2023 | |
| KR | 102500494 B1 | * | 2/2023 | |
| WO | WO-2018175439 A1 | * | 9/2018 | H04L 41/0813 |
| WO | WO-2020067951 A1 | * | 4/2020 | H04W 74/004 |
| WO | WO-2020111764 A1 | * | 6/2020 | H04L 5/0055 |
| WO | WO-2020171674 A1 | * | 8/2020 | H04B 17/318 |
| WO | WO-2021097698 A1 | * | 5/2021 | |
| WO | WO-2021172937 A1 | * | 9/2021 | H04L 1/08 |
| WO | WO-2022027527 A1 | * | 2/2022 | H04L 1/1854 |
| WO | WO-2022154574 A1 | * | 7/2022 | H04L 5/00 |
| WO | WO-2022226802 A1 | * | 11/2022 | H04B 1/7136 |
| WO | WO-2023038342 A1 | * | 3/2023 | H04W 48/16 |
| WO | WO-2023048541 A1 | * | 3/2023 | H04W 48/12 |

OTHER PUBLICATIONS

3GPP TS 38.331 V16.5.0, 3rd Generation Partnership Project; Technical Specification Group Radio Access Network; NR; Radio Resource Control (RRC) protocol specification, (Release 16)', Jul. 6, 2021.

International Search Report and Written Opinion dated Dec. 27, 2022, issued in International Patent Application No. PCT/KR2022/014429.

Qualcomm Incorporated, Complexity Reduction for RedCap Devices, R1-2101766, 3GPP TSG-RAN WG1 Meeting #104, Jan. 22, 2021, XP051975869.

Qualcomm Incorporated, BW Reduction for RedCap UE, R1-2104677, 3GPP TSG-RAN WG1 Meeting #105, May 12, 2021, XP052010928.

Moderator (Intel Corporation), Moderator summary on RedCap—Others, R1-2009317, 3GPP TSG RAN WG1 Meeting #103-E, Nov. 1, 2020, XP052351234.

European Search Report dated Oct. 10, 2024, issued in European Application No. 22873243.4.

* cited by examiner

SYSTEM AND METHOD OF TRANSMITTING AND RECEIVING SYSTEM INFORMATION BY REDUCED CAPABILITY UES

CROSS-REFERENCE TO RELATED APPLICATION(S)

This application is based on and claims priority under 35 U.S.C. § 119(a) of a Korean patent application number 10-2021-0127463 filed on Sep. 27, 2021, in the Korean Intellectual Property Office, the disclosure of which is incorporated by reference herein in its entirety.

BACKGROUND

1. Field

The disclosure relates to operations of a user equipment (UE) and a base station (BS) in a wireless communication system. More particularly, the disclosure relates to a method and an apparatus for acquiring on demand system information.

2. Description of Related Art

Fifth generation (5G) mobile communication technologies define broad frequency bands such that high transmission rates and new services are possible, and may be implemented not only in "Sub 6 GHz" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

Initially, at the beginning of the development of 5G mobile communication technologies, in order to support services and to satisfy performance requirements in connection with an enhanced Mobile BroadBand (eMBB), an Ultra Reliable Low Latency Communications (URLLC), and a massive Machine-Type Communications (mMTC), there has been ongoing standardization regarding beamforming and a massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Bandwidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as a Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, a Non-Terrestrial Network (NTN) which is a UE-satellite direct communication system for providing coverage in an area in which communication with terrestrial networks is unavailable, and positioning.

Further, there has been ongoing standardization in air interface architecture/protocol regarding technologies such as Industrial Internet of Things (IIoT) for supporting new services through interworking and convergence with other industries, an Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on the UE positions.

As the 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research may be scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of the UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The disclosure relates to operations of a user equipment (UE) and a base station (BS) in a wireless communication system. More particularly, the disclosure relates to a method and an apparatus for acquiring on demand system information.

Aspects of the disclosure are to address at least the above-mentioned problems and/or disadvantages and to provide at least the advantages described below. Accordingly, an aspect of the disclosure is to provide a method and apparatus for determining resources for a message for requesting the on demand system information.

Another aspect of the disclosure is to provide a method and an apparatus for requesting system information according to whether an initial uplink Bandwidth Part (BWP) is configured for a redcap UE and/or whether configuration information for SI request for the redcap UE is included in a system information block 1 (SIB1).

Additional aspects will be set forth in part in the description which follows and, in part, will be apparent from the description, or may be learned by practice of the presented embodiments.

In accordance with an aspect of the disclosure, a method performed by a reduced capability user equipment (redcap UE) in a wireless communication system is provided. The method includes acquiring a system information block 1 (SIB1) including information on a first initial uplink bandwidth part (BWP) on a normal uplink (NUL) carrier, identifying whether the SIB1 includes first configuration information used for the redcap UE to request a system information (SI) message, identifying whether a second initial uplink BWP for the redcap UE is configured on the NUL carrier based on the SIB1, in a case that the SIB1 includes the first configuration information for the redcap UE, the second initial uplink BWP for the redcap UE is configured on the NUL carrier, and criteria to select the NUL carrier is met, starting a random access procedure for requesting the SI message on the second initial uplink BWP for the redcap UE on the NUL carrier, based on a preamble resource in the first configuration information, and acquiring the requested SI message.

In accordance with another aspect of the disclosure, a method performed by a base station in a wireless communication system is provided. The method includes transmitting, to a reduced capability user equipment (redcap UE), a system information block 1 (SIB1) including information on a first initial uplink bandwidth part (BWP) on a NUL carrier, in a case that the SIB1 includes first configuration information used for the redcap UE to request a system information (SI) message, a second initial uplink BWP for the redcap UE is configured on the NUL carrier based on the SIB1, and criteria to select the NUL carrier is met, receiving, from the redcap UE, a physical random access channel (PRACH) preamble for requesting the SI message in the second initial uplink BWP for the redcap UE on the NUL carrier, wherein the PRACH preamble is received based on a preamble resource in the first configuration information, and transmitting, to the redcap UE, the requested SI message.

In accordance with another aspect of the disclosure, a reduced capability user equipment (redcap UE) in a wireless communication system is provided. The redcap UE includes a transceiver configured to transmit and receive signals, and a controller coupled with the transceiver and configured to acquire a system information block 1 (SIB1) including information on a first initial uplink bandwidth part (BWP) on a NUL carrier, identify whether the SIB1 includes first configuration information used for the redcap UE to request a system information (SI) message, identify whether a second initial uplink BWP for the redcap UE is configured on the NUL carrier based on the SIB1, in a case that the SIB1 includes the first configuration information for the redcap UE, the second initial uplink BWP for the redcap UE is configured on the NUL carrier, and criteria to select the NUL carrier is met, start a random access procedure for requesting the SI message in the second initial uplink BWP for the redcap UE on the NUL carrier, based on a preamble resource in the first configuration information, and acquire the requested SI message.

In accordance with another aspect of the disclosure, a base station in a wireless communication system is provided. The base station includes a transceiver configured to transmit and receive signals, and a controller coupled with the transceiver and configured to transmit, to a reduced capability user equipment (redcap UE), a system information block 1 (SIB1) including information on a first initial uplink bandwidth part (BWP) on a NUL carrier, in a case that the SIB1 includes first configuration information used for the redcap UE to request a system information (SI) message, a second initial uplink BWP for the redcap UE is configured on the NUL carrier based on the SIB1, and criteria to select the NUL carrier is met, receive, from the redcap UE, a physical random access channel (PRACH) preamble for requesting the SI message in the second initial uplink BWP for the redcap UE on the NUL carrier, wherein the PRACH preamble is received based on a preamble resource in the first configuration information, and transmit, to the redcap UE, the requested SI message.

According to an embodiment of the disclosure, a UE may transmit a SI request message for on demand system information and obtain the requested SI message.

According to an embodiment of the disclosure, the UE may determine a resource for the SI request message in consideration of whether an initial uplink BWP is configured for a redcap UE and/or whether configuration information for SI request for the redcap UE is included in the SIB1.

The effects obtainable in the disclosure are not limited to the above-mentioned effects, and other effects not mentioned herein will be clearly understood from the following description by those skilled in the art to which the disclosure belongs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
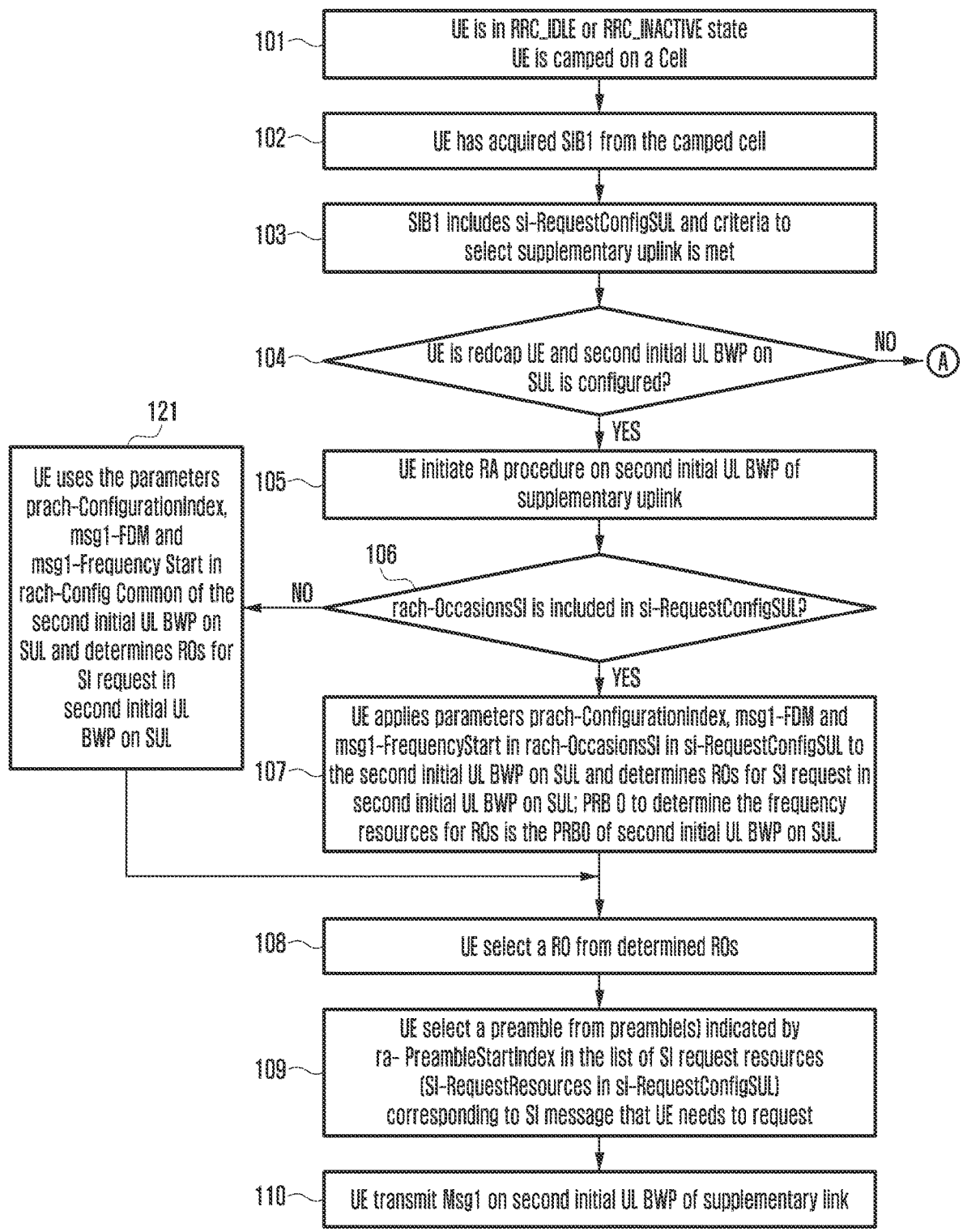
FIGS. 1A and 1B illustrate an example of a flowchart for determining a resource for requesting system information and requesting system information based on the determined resource according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As such, before undertaking the detailed description below, it can be advantageous to set forth definitions of certain words and phrases used herein. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. For example, the terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Various functions described below may be implemented or supported by one or more computer programs, each of which is formed from computer-readable program code or machine-readable instructions and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code or machine-readable instructions. Moreover, the phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Versatile Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data may be stored and later overwritten, such as a rewritable optical disc or an erasable memory device.

Terms used herein to describe the embodiments are not intended to limit and/or define the scope of the disclosure. Unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components.

As used herein, any reference to "one example" or "example", and "one embodiment" or "embodiment" means that particular elements, features, structures or characteristics described in connection with the embodiment may be included in at least one embodiment. The phrases "in one embodiment" or "in one example" appearing in different places do not necessarily refer to the same embodiment.

Additionally, it will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

When it is considered that some detailed explanations about functions or configurations may unnecessarily obscure the essence of the disclosure, these detailed explanations will be omitted. All terms (including descriptive or technical terms) used herein should be interpreted as having meanings apparent to those of ordinary skill in the art. These terms, however, may have different meanings according to the intention of those of ordinary skill in the art, precedents or the emergence of new technologies, and therefore, the terms used herein must be defined based on the meanings of these terms together with the description provided herein.

For example, the base station may be at least one of a gNode B, an eNode B (eNB), a Node B, a radio access unit, a base station controller, and a node on a network. The terminal may include a user equipment (UE), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station.

Accordingly, the various embodiments discussed below for describing the principles of the disclosure herein are for illustration purposes only and should not be interpreted as limiting the scope of the disclosure in any way. Those skilled in the art will understand that the principles of the disclosure may be implemented in any suitably arranged wireless communication system. Although the following detailed description of the embodiments of the disclosure will be directed to 5G, those skilled in the art can understand that the main points of the disclosure may also be applied to other communication systems (for example, beyond 5G (B5G) or 6G) with similar technical backgrounds and channel formats with slight modifications without departing from the scope of the disclosure.

Hereinafter, the embodiments of the disclosure will be described in detail with reference to the accompanying drawings. It should be noted that the same reference numerals in different drawings will be used to refer to the same elements already described.

Carrier Aggregation (CA)/Multi-Connectivity in 5G Wireless Communication System:

The 5G wireless communication system supports standalone mode of operation as well dual connectivity (DC). In DC, a multiple reception (Rx)/transmission (Tx) UE may be configured to utilize resources provided by two different nodes (or NBs) connected via non-ideal backhaul. One node acts as the Master Node (MN) and the other as the Secondary Node (SN). The MN and SN are connected via a network interface and at least the MN may be connected to the core network. NR also supports Multi-RAT Dual Connectivity (MR-DC) operation whereby a UE in RRC_CONNECTED may be configured to utilize radio resources provided by two distinct schedulers, located in two different nodes connected via a non-ideal backhaul and providing either the E-UTRA (i.e. if the node is an ng-eNB) or the NR access (i.e. if the node is a gNB).

For example, in the NR, for a UE in RRC_CONNECTED not configured with CA/DC, there is only one serving cell comprising of the primary cell. For a UE in RRC_CONNECTED configured with CA/DC, the term 'serving cells' is used to denote the set of cells comprising of the Special Cell(s) and all secondary cells. In the NR, the term Master Cell Group (MCG) refers to a group of serving cells associated with the Master Node, comprising of the PCell and optionally one or more Scells. Additionally, in the NR, the term Secondary Cell Group (SCG) refers to a group of serving cells associated with the Secondary Node, comprising of the PSCell and optionally one or more SCells. In NR, PCell (primary cell) refers to a serving cell in MCG, operating on the primary frequency, in which the UE either performs the initial connection establishment procedure or initiates the connection re-establishment procedure. Further, in the NR, for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation, the term SpCell (i.e. Special Cell) refers to the PCell of the MCG or the PSCell of the SCG, otherwise the term Special Cell refers to the PCell.

The UE States in 5G Wireless Communication System:

In an embodiment, in the 5G wireless communication system, the RRC may be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states may further be characterized as follows:

In another embodiment, in the RRC_IDLE, a UE specific DRX may be configured by upper layers. The UE, for example, monitors short Messages transmitted with P-RNTI over DCI; monitors a Paging channel for the CN paging using 5G-S-TMSI; performs neighboring cell measurements and cell (re-)selection; acquires system information and may send SI request (if configured); performs logging of available measurements together with location and time for logged measurement configured UEs.

In still another embodiment, in RRC_INACTIVE, a UE specific DRX may be configured by upper layers or by an RRC layer; the UE stores the UE Inactive AS context; a RAN-based notification area is configured by the RRC layer. The UE, for example, monitors Short Messages transmitted with P-RNTI over DCI; monitors a Paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and may send SI request (if configured); performs logging of available measurements together with location and time for logged measurement configured UEs.

In still yet another embodiment, in the RRC_CONNECTED, the UE stores the AS context and transfer of unicast data to/from the UE takes place. The UE, for example, monitors Short Messages transmitted with the P-RNTI over the DCI, if configured; monitors control channels associated with the shared data channel to determine if data is scheduled for it; provides channel quality and feedback information; performs neighboring cell measurements and measurement reporting; acquires system information.

Downlink Control in 5G Wireless Communication System:

In an embodiment, in the 5G wireless communication system, a Physical Downlink Control Channel (PDCCH) may be used to schedule a downlink (DL) transmissions on the PDSCH and an uplink (UL) transmissions on the PUSCH, where the Downlink Control Information (DCI) on the PDCCH includes: Downlink assignments containing at least modulation and coding format, resource allocation, and hybrid-ARQ information related to a downlink shared channel (DL-SCH). Uplink scheduling grants containing at least modulation and coding format, resource allocation, and hybrid-ARQ information related to UL-S CH. In addition to scheduling, the PDCCH may be used to for: Activation and deactivation of a configured PUSCH transmission with configured grant; Activation and deactivation of the PDSCH semi-persistent transmission; Notifying one or more UEs of the slot format; Notifying one or more UEs of the PRB(s) and OFDM symbol(s) where the UE may assume no transmission may be intended for the UE; Transmission of TPC commands for the PUCCH and the PUSCH; Transmission of one or more the TPC commands for the SRS transmissions by one or more UEs; Switching a UE's active bandwidth part; Initiating a random access procedure.

In another embodiment, the UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. In another embodiment, different code rates for the control channels are realized by aggregating different number of CCE. Interleaved and non-interleaved CCE-to-REG mapping are supported in a CORESET. Polar coding may be used for the PDCCH. Each resource element group carrying a PDCCH carries its own DMRS. QPSK modulation may be used for a PDCCH.

In still another embodiment, in 5G wireless communication system, a list of search space configurations is signaled by gNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). The PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0; \quad \text{Equation 1}$$

In an embodiment, the starting symbol of a PDCCH monitoring occasion in each slot having a PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by gNB for each configured BWP wherein each coreset configuration may be uniquely identified by an identifier.

Note that each radio frame is of 10 ms duration. Radio frame may be identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS may be pre-defined in NR.

Each coreset configuration may be associated with a list of Transmission configuration indicator (TCI) states. One DL reference signal (RS) ID (e.g., Synchronization Signal Block (SSB) or channel state information reference signal (CSI RS)) may be configured per TCI state. The list of TCI states corresponding to a coreset configuration may be signaled by gNB via RRC signaling. One of the TCI state in the TCI state list is activated and indicated to the UE by gNB. A TCI state indicates the DL TX beam (DL TX beam is quasi co located (QCLed) with SSB/CSI RS of TCI state) used by GNB for transmission of PDCCH in the PDCCH monitoring occasions of a search space.

Bandwidth Part (BWP) in 5G Wireless Communication System:

In an embodiment, in 5G wireless communication system bandwidth adaptation (BA) is supported. With BA, the receive and transmit bandwidth of a UE need not be as large as the bandwidth of the cell and may be adjusted: the width may be ordered to change (e.g. to shrink during period of low activity to save power); the location may move in the frequency domain (e.g. to increase scheduling flexibility); and the subcarrier spacing may be ordered to change (e.g. to allow different services). A subset of the total cell bandwidth of a cell may be referred to as a Bandwidth Part (BWP). The BA is achieved by configuring an RRC connected UE with BWP(s) and telling the UE which of the configured BWPs is currently the active one. When the BA is configured, the UE only has to monitor the PDCCH on the one active BWP i.e. it does not have to monitor the PDCCH on the entire DL frequency of the serving cell. In an RRC connected state, the UE may be configured with one or more DL and UL BWPs, for each configured Serving Cell (i.e. primary cell (PCell) or secondary cell (Scell)). For an activated Serving Cell, there is always one active UL and DL BWP at any point in time.

The BWP switching, for example, for a Serving Cell may be used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure.

In another embodiment, upon addition of special cell (SpCell) or activation of an Scell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of the BWP inactivity timer UE switch to the active DL BWP to the default DL BWP or initial DL BWP (if default DL BWP is not configured). In RRC_IDLE and RRC_INACTIVE state, the UE receives downlink transmission from GNB in initial DL BWP and the UE transmits uplink transmissions in initial UL BWP. Initial DL BWP configuration may be signaled by the field initialDownlinkBWP in system information (e.g., system information block 1 (SIB1)). Initial UL BWP configuration is signaled by the field initialUplinkBWP in system information (e.g., SIB1).

System Information Acquisition in 5G Wireless Communication System:

In an embodiment, in the 5G wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In another embodiment, in the 5G wireless communication system (also referred as next generation radio or NR), System Information (SI) may be divided into the MIB and a number of SIBs where:

the MIB, for example, is always transmitted on the broadcast channel (BCH) with a periodicity of 80 ms and repetitions made within 80 ms and it includes parameters that are needed to acquire the SIB1 from the cell.

the SIB1, for example, is transmitted on the DL-SCH with a periodicity of 160 ms and variable transmission repetition. The default transmission repetition periodicity of SIB1 is 20 ms but the actual transmission repetition periodicity is up to network implementation. In an embodiment, the scheduling information in the SIB1 includes mapping between SIBs and SI messages, periodicity of each SI message and an SI window length. In another embodiment, the scheduling information in the SIB1 includes an indicator for each SI message, which indicates whether the concerned SI message is being broadcasted or not. If at least one SI message is not being broadcasted, the SIB1 may include random access resources (PRACH preamble(s) and PRACH resource(s)) for requesting gNB to broadcast one or more SI message(s).

SIBs other than the SIB1 are carried in System Information (SI) messages, which are transmitted on the DL-SCH. Only the SIBs having the same periodicity may be mapped to the same SI message. In still another embodiment, each SI message may be transmitted within periodically occurring time domain windows (referred to as SI-windows with same length for all SI messages). In an embodiment, each SI message may be associated with a SI-window and the SI-windows of different SI messages do not overlap. Within one SI-window only the corresponding SI message is transmitted. Any SIB except the SIB1 may be configured to be cell specific or area specific, using an indication in the SIB1. The cell specific SIB is applicable only within a cell that provides the SIB while the area specific SIB is applicable within an area referred to as SI area, which consists of one or several cells and is identified by systemInformationAreaID.

The UE acquires the SIB1 from the camped or serving cell. The UE checks the BroadcastStatus bit in the SIB1 for an SI message which the UE needs to acquire. SI request configuration for initial UL BWP on a supplementary uplink (SUL) is signaled by gNB using the IE si-RequestConfigSUL in the SIB1. The SIB1 includes field ServingCellConfigCommonSIB. The field ServingCellConfigCommonSIB includes field supplementaryUplink. SupplementaryUplink field includes initialUplinkBWP which indicates initial UL BWP configuration (a RACH configuration, a PUCCH configuration, a PUSCH configuration, location and bandwidth of a BWP, subcarrier spacing of BWP, etc.) on the SUL. In a situation in which the IE si-RequestConfigSUL is not present in SIB1, the UE considers that an SI request configuration for initial uplink BWP on SUL is not signaled by gNB. The SI request configuration for initial UL BWP on a normal uplink (NUL) is signaled by gNB using the IE si-RequestConfig in the SIB1. The SIB1 includes field S ervingCellConfigCommonSIB1. The field ServingCellConfigCommonSIB includes field uplinkConfigCommon. uplinkConfigCommon field includes initialUplinkBWP which indicates initial UL BWP configuration (RACH configuration, the PUCCH configuration, the PUSCH configuration, location and bandwidth of the BWP, subcarrier spacing of BWP, etc.) on the NUL. In a situation in which the IE si-RequestConfig is not present in SIB1, the UE considers that the SI request configuration for an initial uplink BWP on the NUL is not signaled by the gNB. If the SI message which the UE needs to acquire is not being broadcasted (i.e. BroadcastStatus bit is set to zero), the UE initiates transmission of the SI request.

The Procedure for SI Request Transmission is as Follows:

If the SI request configuration is signaled by the gNB for the initial UL BWP on the SUL, and criteria to select the SUL is met (i.e. RSRP derived from SSB measurements of camped or serving cell<rsrp-ThresholdSSB-SUL, where rsrp-ThresholdSSB-SUL is signaled by the gNB (e.g. in broadcast signaling such as SIB1)): the UE initiates transmission of SI request based on message 1 (Msg1) based SI request on the SUL. In an embodiment, the UE initiates Random Access procedure using the PRACH preamble(s) and PRACH resource(s) in the SI request configuration of the SUL. During the random access procedure, the UE transmits and receives on initial uplink BWP on the SUL and initial downlink BWP respectively. In another embodiment, the UE transmits Msg1 (i.e. Random access preamble) and waits for acknowledgement for SI request. Random access resources (the PRACH preamble(s) and PRACH occasions(s)) indicated in the SI request configuration of SUL is used for Msg1. Msg1 is transmitted on the SUL. In a situation in which acknowledgement for SI request is received, the UE monitors the SI window of the requested SI message in one or more SI period(s) of that SI message.

Else if the SI request configuration is signaled by the gNB for the initial UL BWP on NUL and criteria to select the NUL is met (i.e., the NUL is selected if the SUL is supported in camped or serving cell and the RSRP derived from the SSB measurements of camped or serving cell>=rsrp-ThresholdSSB-SUL; OR NUL is selected if SUL is not supported in serving cell):the UE initiates transmission of the SI request based on Msg1 based SI request on NUL (350). In other words, the UE initiates Random Access procedure using the PRACH preamble(s) and PRACH resource(s) in SI request configuration of NUL. During the random access procedure, the UE transmits and receives on initial uplink BWP on the NUL and initial downlink BWP respectively. The UE transmits Msg1 (i.e. Random access preamble) and waits for acknowledgement for SI request. Random access resources (the PRACH preamble(s) and PRACH occasions(s)) indicated in SI request configuration of NUL is used for Msg1. Msg1 is transmitted on NUL. If acknowledgement for SI request is received, the UE monitors the SI window of the requested SI message in one or more SI period(s) of that SI message.

Else, the UE initiates transmission of the SI request based on message 3 (Msg3) based SI request. In other words, the UE initiates transmission of RRCSystemInfoRequest message (345). The UE transmits Msg1 (i.e. Random access preamble) and waits for random access response (RAR). Common random access resources (PRACH preamble(s) and PRACH occasions(s)) are used for Msg1 on the selected UL carrier. In the UL grant received in random access response, the UE transmits RRCSystemInfoRequest message and waits for acknowledgement for SI request (i.e. RRCSystemInfoRequest message). If acknowledgement for the SI request (i.e., RRCSystemInfoRequest message) is received, the UE monitors the SI window of the requested SI message in one or more SI period(s) of that SI message. Note that if the SUL is configured, the UL carrier for Msg1 transmission will be selected by the UE in similar manner as selected by the UE for Msg1 based SI request. The SUL may be the selected the UL carrier, if the RSRP derived from SSB measurements of camped or serving cell<rsrp-ThresholdSSB-SUL where rsrp-ThresholdSSB-SUL is signaled by gNB (e.g. in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by gNB (e.g. in broadcast signaling such as SIB1).

In an embodiment, the UE in RRC_IDLE and RRC_INACTIVE state, receives downlink transmission from GNB in initial DL BWP and the UE transmits uplink transmissions in an initial UL BWP. Initial DL BWP configuration is signaled by the field initialDownlinkBWP in system information (e.g., SIB1). Initial UL BWP configuration is signaled by the field initialUplinkBWP in system information (e.g., SIB1). There is one initial UL BWP on an Uplink carrier of serving cell. There is one initial downlink BWP on downlink carrier of serving cell.

In another embodiment, in order to support reduced capability UEs (redcap UEs), additional initial uplink BWP may be configured on uplink carrier of serving cell and an additional downlink BWP may be configured on downlink carrier of serving cell. The issue is how to signal SI request resources for reduced capability UEs and how to determine whether to perform Msg1/Msg3 based SI request by reduced capability UEs. A reduced capability UE is the UE which supports reduced number of UE RX/TX antennas, reduced bandwidth, relaxed UE processing time, relaxed UE processing capability, reduced Maximum number of DL MIMO layers, relaxed maximum modulation order, and/or duplex operation.

FIGS. 1A, 1B, 2A, and 2B illustrate examples of a flowchart for determining a resource for requesting system information and requesting system information based on the determined resource according to various embodiments of the disclosure.

Referring to FIGS. 1A, 1B, 2A, and 2B, embodiments of the disclosure will be described.

Embodiment 1

The UE is in RRC_IDLE state or RRC_INACTIVE state.

The UE is camped on a cell (also referred as PCell) at operations 101, 201.

In an embodiment, the cell may be configured with a first initial UL BWP and a second initial UL BWP on a UL carrier. The cell may be configured with one UL carrier i.e. The NUL carrier or the cell may be configured with two UL carriers i.e., the NUL and SUL carrier. The UE may be configured with a first initial UL BWP and/or a second initial UL BWP on the NUL carrier. The UE may be configured with a first initial UL BWP and/or a second initial UL BWP on the SUL carrier.

The first initial UL BWP may be for non-redcap UEs (UEs other than the reduced capability UEs). The second initial UL BWP may be for redcap UEs (reduced capability UEs). BWP configuration of the first and second initial UL BWPs of the UL carrier may be signaled in system information (e.g. in the SIB1).

The UE has acquired SIB1 from the camped cell at operations 102, 202.

The SIB1 transmitted in the camped cell may include si-RequestConfig and/or si-RequestConfigSUL IEs. The si-RequestConfig IE and si-RequestConfigSUL IE may contain a configuration for Msg1 based SI request.

In this embodiment of the disclosure, si-RequestConfig and/or si-RequestConfigSUL in the SIB1 may indicate SI request resources for both redcap and non-redcap UEs.

In an embodiment, the si-RequestConfig IE in the SIB1 may indicate SI request RACH resources for the first initial UL BWP on NUL and the second initial UL BWP on NUL.

In another embodiment, the si-RequestConfig IE may optionally include rach-OccasionsSI. The rach-OccasionsSI includes a configuration of dedicated RACH Occasions for an SI request on NUL. The RACH occasions from these dedicated RACH Occasions for the SI request to be used for requesting a specific SI message may be further indicated by si-RequestResources IE in si-RequestConfig IE.

The rach-OccasionsSI in si-RequestConfig may include prach-ConfigurationIndex, msg1-FDM and msg1-FrequencyStart. These may be used by both the redcap UE and the non-redcap UE to determine dedicated RACH Occasions for SI request on NUL. Prach-ConfigurationIndex indicates the time instances of PRACH transmission occasions. Msg1-FDM indicates the number of PRACH transmission occasions FDMed in one-time instance. Msg1-FrequencyStart is the offset of lowest PRACH transmission occasion in frequency domain with respective to PRB 0.

If a UE is a redcap UE and a second initial UL BWP on NUL is configured at operation 204, the UE may apply parameters prach-ConfigurationIndex, msg1-FDM and msg1-FrequencyStart in rach-OccasionsSI in si-RequestConfig IE to the second initial UL BWP on NUL and determine ROs in the second initial UL BWP on NUL. PRB 0 is the PRB 0 of second initial UL BWP on NUL at operation 207. The UE may select a RO from the determined ROs at operation 208 and select a preamble from preamble(s) indicated by ra-PreambleStartIndex in a list of SI request resources (i.e., SI-RequestResources in si-RequestConfig) corresponding to SI message that the UE needs to request SI at operation 209. The UE may transmit Msg1 on the second initial UL BWP of NUL at operation 210.

If a UE is a redcap UE and the second initial UL BWP on NUL is not configured at operation 211, the UE may apply parameters prach-ConfigurationIndex, msg1-FDM and msg1-FrequencyStart in rach-OccasionsSI in si-RequestConfig IE to the first initial UL BWP on NUL and determine ROs in first initial UL BWP on NUL. PRB 0 is the PRB 0 of first initial UL BWP on NUL at operation 213.

If a UE is not a redcap UE, the UE may apply parameters prach-ConfigurationIndex, msg1-FDM and msg1-FrequencyStart in rach-OccasionsSI in si-RequestConfig IE to the first initial UL BWP on NUL and determine ROs in first initial UL BWP on NUL. PRB 0 is the PRB 0 of first initial UL BWP on NUL at operation 213. The UE may select a RO from the determined ROs at operation 214 and select a preamble from preamble(s) indicated by ra-PreambleStartIndex in a list of SI request resources (i.e., SI-RequestResources in si-RequestConfig) corresponding to SI message that the UE needs to request at operation 215. The UE may transmit Msg1 on first initial UL BWP of NUL at operation 216.

If rach-OccasionsSI is absent in si-RequestConfig IE:
If the second initial UL BWP on NUL is configured, the redcap UE may use the corresponding parameters (e.g. RACH occasions) configured in rach-ConfigCommon IE of the second initial UL BWP on NUL. Parameters prach-ConfigurationIndex, msg1-FDM and msg1-FrequencyStart in rach-ConfigCommon of the second initial UL BWP on NUL may be used by the redcap UE to determine RACH Occasions of second initial uplink BWP on NUL at operation 221. The RACH occasions to be used for requesting a specific SI message, from the RACH Occasions configured by rach-ConfigCommon of the second initial UL BWP on NUL, may be further indicated by si-RequestResources IE in si-RequestConfig IE.

If the second initial UL BWP on NUL is not configured, the redcap UE may use the corresponding parameters (e.g. RACH occasions) configured in rach-ConfigCommon IE of the first initial uplink BWP on NUL. Parameters prach-ConfigurationIndex, msg1-FDM and msg1-FrequencyStart in rach-ConfigCommon of the first initial UL BWP on NUL may be used by the redcap UE to determine RACH Occasions on first initial uplink BWP on NUL at operation 231. The RACH occasions to be used for requesting a specific SI message, from the RACH Occasions configured by rach-ConfigCommon of the first initial UL BWP on NUL, may be further indicated by si-RequestResources IE in si-RequestConfig IE.

The non-redcap UE may use the corresponding parameters (e.g. RACH occasions) configured in rach-ConfigCommon of the first initial uplink BWP on NUL. Parameters prach-ConfigurationIndex, msg1-FDM and msg1-FrequencyStart in rach-ConfigCommon of the first initial UL BWP on NUL may be used by the UE to determine RACH Occasions on the first initial uplink BWP on NUL. The RACH occasions to be used for requesting a specific SI message, from the RACH Occasions configured by rach-ConfigCommon of the first initial UL BWP on NUL, may be further indicated by si-RequestResources IE in si-RequestConfig IE.

In an embodiment, the si-RequestConfig IE may include si-RequestPeriod and/or si-RequestResources. The parameter si-RequestPeriod indicates periodicity of the SI-Request configuration in number of association periods. The parameter si-RequestResources is a list of SI request resources for requesting SI messages which are not periodically broadcasted. If there is only one entry in the list, the configuration is used for all SI messages for which si-BroadcastStatus is set to notBroadcasting. Otherwise the $1^{st}$ entry in the list corresponds to the first SI message in schedulingInfoList for which si-BroadcastStatus is set to notBroadcasting, $2^{nd}$ entry in the list corresponds to the second SI message in schedulingInfoList for which si-BroadcastStatus is set to notBroadcasting and so on.

Each entry in the list includes parameters ra-PreambleStartIndex, ra-AssociationPeriodIndex, and/or ra-ssb-OccasionMaskIndex. ra-AssociationPeriodIndex is the index of the association period in the si-RequestPeriod in which the UE may send the SI request for SI message(s) corresponding to this SI-RequestResources, using the preambles indicated by ra-PreambleStartIndex and rach occasions indicated by ra-ssb-OccasionMaskIndex. ra-ssb-OccasionMaskIndex indicates subset of RACH occasions from the RACH occasions indicated by rach-OccasionsSI or common RACH configuration (if rach-OccasionsSI is not configured) to be used for requesting a SI message. If N SSBs are associated with a RACH occasion, where N>=1, for the i-th SSB (i=0, ..., N-1) the preamble with preamble index=ra-PreambleStartIndex+i is used for SI request; For N<1, the preamble with preamble index=ra-PreambleStartIndex is used for SI request.

The si-RequestConfigSUL IE in the SIB1 may indicate SI request RACH resources for the first initial UL BWP on SUL and the second initial UL BWP on SUL.

SIB1 may include si-RequestConfigSUL IE and criteria to select supplementary uplink may be met at operation 103.

In an embodiment, the si-RequestConfigSUL IE may optionally include rach-OccasionsSI at operations 106, 112, 206, 212. The rach-OccasionsSI may include a configuration of dedicated RACH Occasions for SI request on SUL. The RACH occasions from the dedicated RACH Occasions for SI request to be used for requesting a specific SI message may be further indicated by si-RequestResources IE in si-RequestConfigSUL IE.

The parameter rach-OccasionsSI in si-RequestConfigSUL IE may include prach-ConfigurationIndex, msg1-FDM and msg1-FrequencyStart. These are used by both the redcap and the non-redcap UE to determine dedicated RACH Occasions for SI request on SUL. The parameter prach-ConfigurationIndex indicates the time instances of PRACH transmission occasions. The parameter msg1-FDM indicates the number of PRACH transmission occasions FDMed in one-time instance. The parameter msg1-FrequencyStart is the offset of lowest PRACH transmission occasion in frequency domain with respective to PRB 0.

If a UE is a redcap UE and a second initial UL BWP on SUL is configured at operation 104, the UE may initiate RA procedure on the second initial UL BWP of SUL at operation 105. More specifically, if a UE is a redcap UE and the second initial UL BWP on SUL is configured at operation 104, the UE may apply parameters prach-ConfigurationIndex, msg1-FDM and msg1-FrequencyStart in rach-OccasionsSI in si-RequestConfigSUL IE to the second initial UL BWP on SUL and determine ROs in second initial UL BWP on SUL. PRB 0 is the PRB0 of the second initial UL BWP on SUL at operation 107. The UE may select a RO from the determined ROs at operation 108 and select a preamble from preamble(s) indicated by ra-PreambleStartIndex in a list of SI request resources (i.e., SI-RequestResources in si-RequestConfigSUL) corresponding to SI message that the UE needs to request SI at operation 109. The UE may transmit Msg1 on the second initial UL BWP of SUL at operation 110.

If a UE is a redcap UE and the second initial UL BWP on SUL is not configured, the UE may initiate RA procedure on the first initial UL BWP of SUL at operation 111. More specifically, the UE may apply parameters prach-ConfigurationIndex, msg1-FDM and msg1-FrequencyStart in rach-OccasionsSI in si-RequestConfigSUL IE to the first initial UL BWP on SUL and determine Ros in first initial UL BWP on SUL. PRB 0 is the PRB0 of the first initial UL BWP on SUL at operation 113. The UE may select a RO from the determined ROs at operation 114 and select a preamble from preamble(s) indicated by ra-PreambleStartIndex in a list of SI request resources (i.e., SI-RequestResources in si-RequestConfigSUL) corresponding to SI message that the UE needs to request at operation 115. The UE may transmit Msg1 on the first initial UL BWP of SUL at operation 116.

If a UE is not a redcap UE, the UE may apply parameters prach-ConfigurationIndex, msg1-FDM and msg1-FrequencyStart in rach-OccasionsSI in si-RequestConfigSUL IE to the first initial UL BWP on SUL and determine ROs in the first initial UL BWP on SUL. PRB 0 is the PRB0 of the first initial UL BWP on SUL at operation 113. The UE may select a RO from the determined ROs at operation 114 and select a preamble from preamble(s) indicated by ra-PreambleStartIndex in a list of SI request resources (i.e., SI-RequestResources in si-RequestConfigSUL) corresponding to SI message that the UE needs to request at operation 115. The UE may transmit Msg1 on the first initial UL BWP of SUL at operation 116.

If Rach-OccasionsSI is Absent in si-RequestConfigSUL IE:

If the second initial UL BWP on SUL is configured, the redcap UE may use the corresponding parameters (e.g. RACH occasions) configured in rach-ConfigCommon of the second initial UL BWP on SUL. Parameters prach-ConfigurationIndex, msg1-FDM and msg1-FrequencyStart in rach-ConfigCommon of the second initial UL BWP on SUL may be used by the redcap UE to determine RACH Occasions second initial uplink BWP on SUL at operation 121. The RACH occasions to be used for requesting a specific SI message, from the RACH Occasions configured by rach-ConfigCommon of the second initial UL BWP on SUL, may be further indicated by si-RequestResources IE in si-RequestConfigSUL IE.

If the second initial UL BWP on SUL is not configured, the redcap UE may use the corresponding parameters (e.g. RACH occasions) configured in rach-ConfigCommon of the first initial uplink BWP on SUL. Prach-ConfigurationIndex, msg1-FDM and msg1-FrequencyStart in rach-ConfigCommon of the first initial UL BWP on SUL is used by the redcap UE to determine RACH Occasions on the first initial uplink BWP on SUL at operation 131. The RACH occasions to be used for requesting a specific SI message, from the RACH Occasions configured by rach-ConfigCommon of the first initial UL BWP on SUL, may be further indicated by si-RequestResources IE in si-RequestConfigSUL IE.

The non-redcap UE may use the corresponding parameters (e.g. RACH occasions) configured in rach-ConfigCommon of the first initial uplink BWP on SUL. Parameters prach-ConfigurationIndex, msg1-FDM and msg1-FrequencyStart in rach-ConfigCommon of the first initial UL BWP on SUL may be used by the UE to determine RACH Occasions on the first initial uplink BWP on SUL at operation 131. The RACH occasions to be used for requesting a specific SI message, from the RACH Occasions configured by rach-ConfigCommon of the first initial UL BWP on SUL, is further indicated by si-RequestResources IE in si-RequestConfigSUL IE.

In an embodiment, the si-RequestConfigSUL IE includes si-RequestPeriod and si-RequestResources. The si-RequestPeriod indicates periodicity of the SI-Request configuration in number of association periods. The si-RequestResources is a list of SI request resources for requesting SI messages which are not periodically broadcasted. If there is only one entry in the list, the configuration may be used for all SI messages for which si-BroadcastStatus is set to notBroadcasting. Otherwise the $1^{st}$ entry in the list corresponds to the first SI message in schedulingInfoList for which si-BroadcastStatus is set to notBroadcasting, $2^{nd}$ entry in the list corresponds to the second SI message in schedulingInfoList for which si-BroadcastStatus is set to notBroadcasting and so on.

Each entry in the list includes ra-PreambleStartIndex, ra-AssociationPeriodIndex, ra-ssb-OccasionMaskIndex. The ra-AssociationPeriodIndex is the index of the association period in the si-RequestPeriod in which the UE may send the SI request for SI message(s) corresponding to this SI-RequestResources, using the preambles indicated by ra-PreambleStartIndex and rach occasions indicated by ra-ssb-OccasionMaskIndex. ra-ssb-OccasionMaskIndex indicates subset of RACH occasions from the RACH occasions indicated by rach-OccasionsSI or common RACH configuration (if rach-OccasionsSI is not configured) to be used for requesting a SI message. If N SSBs are associated with a RACH occasion, where N>=1, for the i-th SSB (i=0, ..., N-1) the preamble with preamble index=ra-PreambleStartIndex+i is used for SI request; For N<1, the preamble with preamble index=ra-PreambleStartIndex is used for SI request for any SSB. The UE selects an SSB and then select a preamble corresponding to selected SSB from the preambles indicates by ra-PreambleStartIndex corresponding to the SI message that the UE needs to request.

Figure 1B:
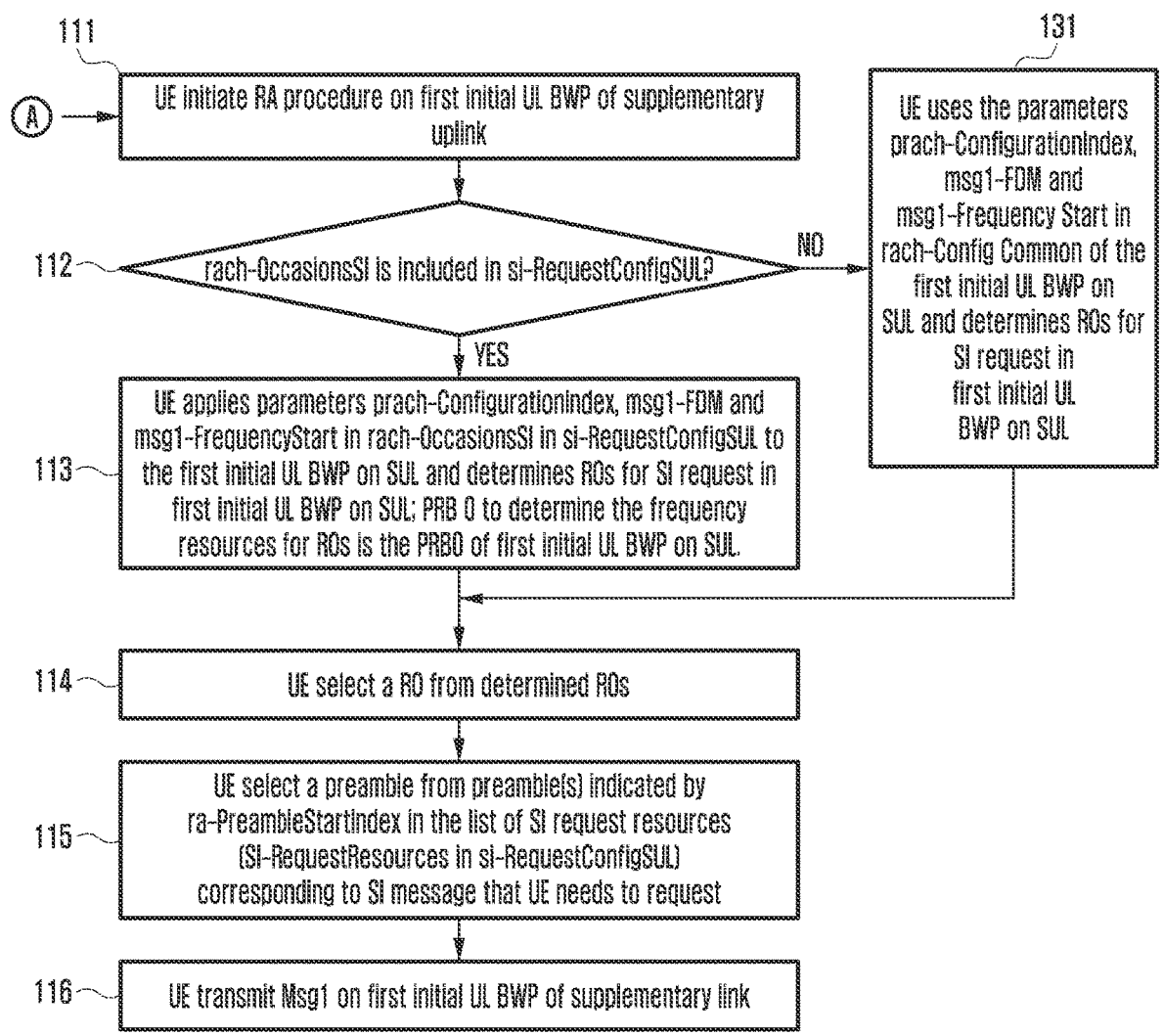
Figure 2A:
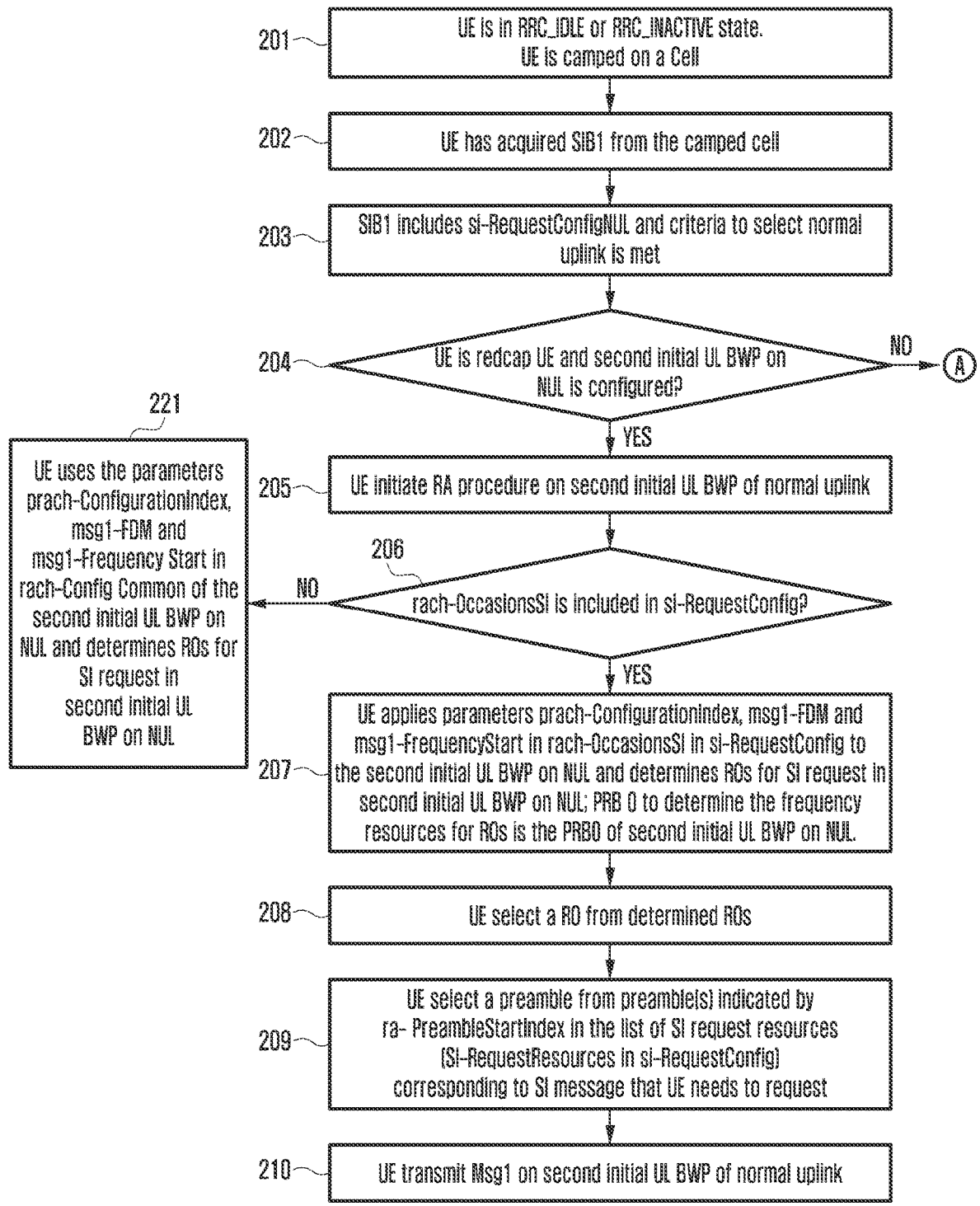
FIGS. 2A and 2B illustrate an example of a flowchart for determining a resource for requesting system information and requesting system information based on the determined resource according to various embodiments of the disclosure.
Figure 2B:
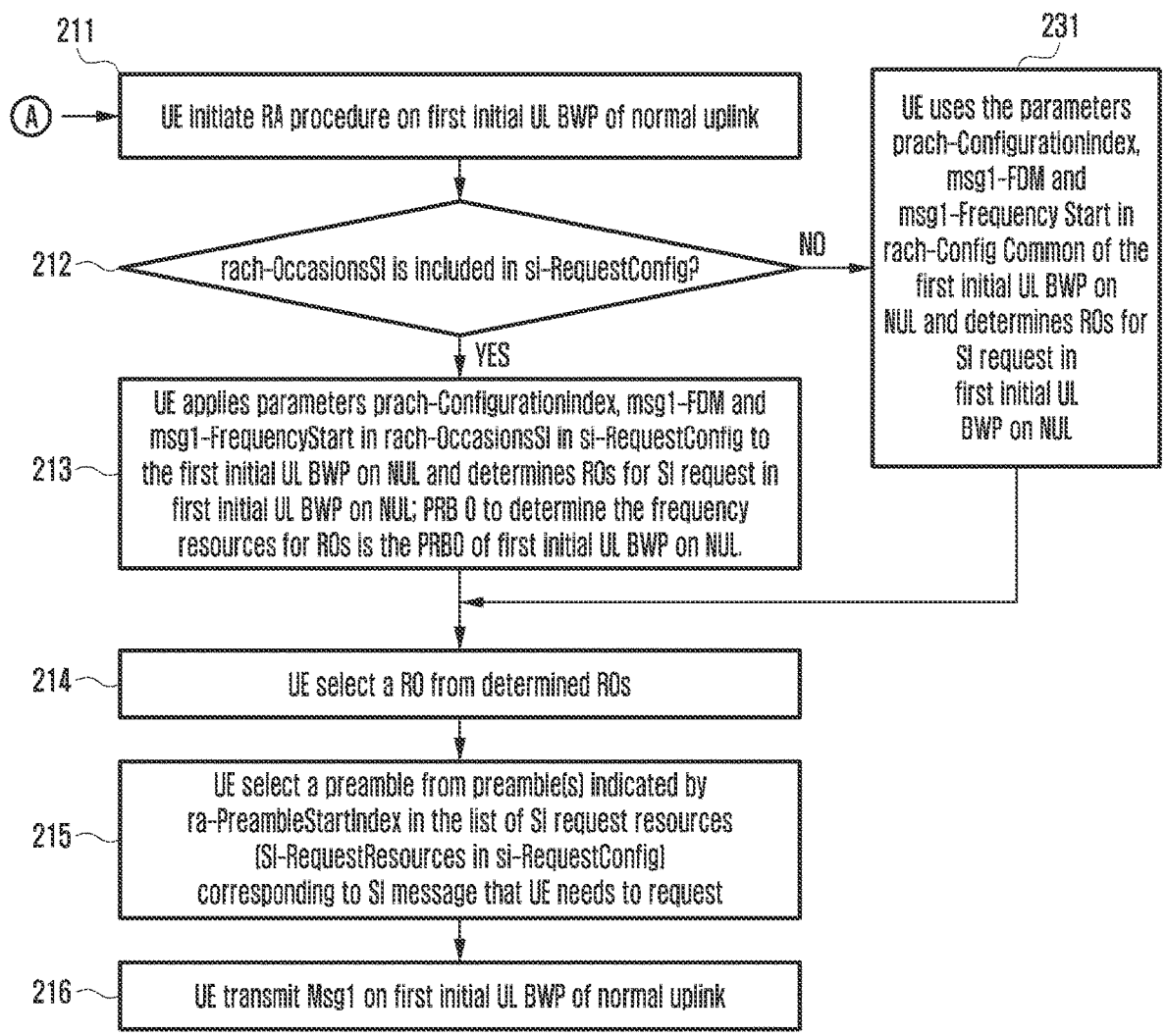

Selection between Msg1 or Msg3 based SI request:

if SIB1 includes si-RequestConfigSUL and criteria to select supplementary uplink is met (as illustrated in FIGS. 1A and 1B), a UE may initiate transmission of SI request based on Msg1 based SI request on SUL. In an embodiment, the UE may initiate RA procedure on supplementary uplink using the PRACH preamble(s) and PRACH resource(s) in si-RequestConfigSUL corresponding to the SI message(s) that the UE requires to operate within the cell, and for which si-BroadcastStatus is set to notBroadcasting.

A redcap UE may use PRACH preamble(s) and PRACH resource(s) indicated by si-RequestConfigSUL on the second initial UL BWP on SUL, Msg1 may be transmitted on second initial UL BWP on SUL. If second initial UL BWP is not configured on SUL, the redcap UE may use PRACH preamble(s) and PRACH resource(s) indicated by si-RequestConfigSUL on the first initial UL BWP on SUL, Msg1 may be transmitted on the first initial UL BWP on SUL.

The non redcap UE may use PRACH resources indicated by si-RequestConfigSUL on the first initial UL BWP on SUL.

Else if SIB1 includes si-RequestConfig and criteria to select normal uplink is met at operation 203 (referring to FIGS. 2A and 2B), the UE may initiate transmission of SI request based on Msg1 based SI request on NUL i.e. RA procedure on normal uplink using the PRACH preamble(s) and PRACH resource(s) in si-RequestConfig corresponding to the SI message(s) that the UE requires to operate within the cell, and for which si-BroadcastStatus is set to notBroadcasting.

Specifically, a redcap UE may use PRACH resources indicated by si-RequestConfig on the second initial UL BWP on NUL, Msg1 may be transmitted on the second initial UL BWP on NUL at operation 205. If second initial UL BWP is not configured, the redcap UE may use PRACH resources indicated by si-RequestConfig on the first initial UL BWP on NUL, Msg1 may be transmitted on the first initial UL BWP on NUL.

The non redcap UE may use PRACH resources indicated by si-RequestConfig on first initial UL BWP on NUL.

Else, the UE may initiate transmission of SI request based on Msg3 i.e., the UE may initiate transmission of the RRCSystemInfoRequest message.

The redcap UE may use common RACH resources of the second initial UL BWP of selected UL carrier. If second initial UL BWP is not configured on selected UL carrier, the redcap UE may use the common RACH resources of the first initial uplink BWP of selected UL carrier.

The non redcap UE may use common RACH resources of the first initial UL BWP of selected UL carrier.

In an embodiment, the SUL may be selected if the SUL is configured and RSRP derived from SSB measurements of camped cell or serving cell<rsrp-ThresholdSSB-SUL, where rsrp-ThresholdSSB-SUL is signaled by gNB (e.g. in broadcast signaling such as SIB1). The NUL may be selected if the SUL is supported in camped cell and RSRP derived from SSB measurements of camped cell or serving cell>=rsrp-ThresholdSSB-SUL; OR NUL may be selected if SUL is not supported in serving cell.

In an embodiment, if the first and second initial DL BWPs are configured in a cell, upon initiating random access procedure for SI request, the redcap UE may switch to the second initial DL BWP for receiving RAR, if RAR search space is configured on the second initial DL BWP. In an embodiment, the switching to the second initial DL BWP may be performed only if the UE is using second initial UL BWP for UL transmissions.

Embodiment 2

The UE is in RRC_IDLE state or RRC_INACTIVE state.
The UE is camped on a cell (also referred as PCell).
The cell may be configured with a first initial UL BWP and a second initial UL BWP on a UL carrier. The cell may be configured with one UL carrier i.e. NUL carrier or the cell may be configured with two UL carriers i.e., NUL and SUL carrier. The UE may be configured with a first initial UL BWP and/or second initial UL BWP on NUL carrier. The UE may be configured with a first initial UL BWP and/or second initial UL BWP on SUL carrier.

The first initial UL BWP may be for non-redcap UEs (UEs other than the reduced capability UEs). The second initial UL BWP may be for redcap UEs (reduced capability UEs). BWP configuration of the first and second initial UL BWPs of UL carrier may be signaled in system information (e.g. in the SIB1).

The UE may acquire SIB1 from the camped cell. SIB1 transmitted in the camped cell may include si-RequestConfig IE and/or si-RequestConfigSUL IE.

The SIB1 transmitted in the camped cell may include si-RequestConfigRedcap IE and/or si-RequestConfigRedcapSUL IE.

In an embodiment, si-RequestConfig and/or si-RequestConfigSUL in SIB1 may indicate SI request resources for non-redcap UEs. If second initial UL BWP on NUL is not configured, si-RequestConfig in SIB1 may also indicate SI request resources for redcap UEs. If second initial UL BWP on NUL is configured, si-RequestConfigRedcap in SIB1 may indicate SI request resources for redcap UEs. If second initial UL BWP on SUL is not configured, si-RequestConfigSUL in SIB1 may also indicate SI request resources for redcap UEs. If second initial UL BWP on SUL is configured, si-RequestConfigRedcapSUL in SIB1 may indicate SI request resources for redcap UEs.

In an embodiment, the si-RequestConfigRedcap IE in SIB1 may indicate SI request RACH resources for the second initial UL BWP on NUL. It may be only used by Redcap UEs.

In an embodiment, the si-RequestConfigRedcap IE may optionally include rach-OccasionsSI. The rach-OccasionsSI may include a configuration of dedicated RACH Occasions for SI request on the second initial UL BWP of NUL. The RACH occasions from these dedicated RACH Occasions for SI request to be used for requesting a specific SI message may be further indicated by si-RequestResources IE in si-RequestConfigRedcap IE.

The rach-OccasionsSI in si-RequestConfigRedcap IE may include prach-ConfigurationIndex, msg1-FDM and msg1-FrequencyStart which are used by the redcap UE to determine dedicated RACH Occasions for SI request on the second initial UL BWP NUL. The parameter prach-ConfigurationIndex indicates the time instances of PRACH transmission occasions. The parameter msg1-FDM indicates the number of PRACH transmission occasions FDMed in one-time instance. The parameter msg1-FrequencyStart is the offset of lowest PRACH transmission occasion in frequency domain with respective to PRB 0.

If a UE is a redcap UE, the UE may apply parameters prach-ConfigurationIndex, msg1-FDM and msg1-FrequencyStart in rach-OccasionsSI in si-RequestConfigRedcap IE to the second initial UL BWP on NUL and determine Ros in second initial UL BWP on NUL. PRB 0 is the PRB 0 of second initial UL BWP on NUL.

If rach-OccasionsSI is absent in si-RequestConfigRedcap:
the redcap UE may use the corresponding parameters (e.g. RACH occasions) configured in rach-ConfigCommon IE of the second initial UL BWP on NUL. Parameters prach-ConfigurationIndex, msg1-FDM and msg1-FrequencyStart in rach-ConfigCommon IE of the second initial UL BWP on NUL may be used by the redcap UE to determine RACH Occasions of the second initial uplink BWP on NUL. The RACH occasions to be used for requesting a specific SI message, from the RACH Occasions configured by rach-ConfigCommon of the second initial UL BWP on NUL, may be further indicated by si-RequestResources IE in si-RequestConfigRedcap IE.

In an embodiment, the si-RequestConfigRedcapSUL IE in SIB1 may indicate SI request RACH resources for second initial UL BWP on SUL. It may be only used by redcap UEs.

In an embodiment, the si-RequestConfigRedcapSUL IE may optionally include rach-OccasionsSI. The rach-OccasionsSI may include a configuration of dedicated RACH Occasions for SI request on the second initial UL BWP of SUL. The RACH occasions from these dedicated RACH Occasions for SI request to be used for requesting a specific SI message may be further indicated by si-RequestResources IE in si-RequestConfigRedcapSUL IE.

The rach-OccasionsSI in si-RequestConfigRedcapSUL may include prach-ConfigurationIndex, msg1-FDM and msg1-FrequencyStart. These may be used by the redcap UE to determine dedicated RACH Occasions for SI request on second initial UL BWP SUL. Prach-ConfigurationIndex indicates the time instances of PRACH transmission occasions. Msg1-FDM indicates the number of PRACH transmission occasions FDMed in one-time instance. Msg1-FrequencyStart is the offset of lowest PRACH transmission occasion in frequency domain with respective to PRB 0.

If a UE is a redcap UE, the UE may apply parameters prach-ConfigurationIndex, msg1-FDM and msg1-FrequencyStart in rach-OccasionsSI in si-RequestConfigRedcapSUL to the second initial UL BWP on SUL and determine ROs in second initial UL BWP on SUL. PRB 0 is the PRB0 of second initial UL BWP on SUL.

If rach-OccasionsSI is absent in si-RequestConfigRedcapSUL:
The redcap UE may use the corresponding parameters (e.g. RACH occasions) configured in rach-ConfigCommon IE of the second initial UL BWP on SUL. Parameters prach-ConfigurationIndex, msg1-FDM and msg1-FrequencyStart in rach-ConfigCommon of the second initial UL BWP on SUL may be used by the redcap UE to determine RACH Occasions the second initial uplink BWP on SUL. The RACH occasions to be used for requesting a specific SI message, from the RACH Occasions configured by rach-ConfigCommon of the second initial UL BWP on SUL, may be further indicated by si-RequestResources IE in si-RequestConfigRedcapSUL IE.

In an embodiment, the si-RequestConfig IE in SIB1 may indicate SI request RACH resources for the first initial UL BWP on NUL for both redcap and non-redcap UEs. The redcap UE may use this only when second initial UL BWP on NUL is not configured.

In an embodiment, the si-RequestConfig IE may optionally include rach-OccasionsSI. The rach-OccasionsSI may include a configuration of dedicated RACH Occasions for SI request for the first initial UL BWP on NUL. The RACH occasions from these dedicated RACH Occasions for SI request to be used for requesting a specific SI message may be further indicated by si-RequestResources IE in si-RequestConfig IE.

The parameter rach-OccasionsSI in si-RequestConfig IE may include prach-ConfigurationIndex, msg1-FDM and msg1-FrequencyStart. These may be used by both redcap and the non-redcap UE to determine dedicated RACH Occasions for SI request for the first initial UL BWP on NUL. The parameter prach-ConfigurationIndex indicates the time instances of PRACH transmission occasions. The parameter msg1-FDM indicates the number of PRACH transmission occasions FDMed in one-time instance. The parameter msg1-FrequencyStart is the offset of lowest PRACH transmission occasion in frequency domain with respective to PRB 0.

The UE may apply parameters prach-ConfigurationIndex, msg1-FDM and msg1-FrequencyStart in rach-OccasionsSI to the first initial UL BWP on NUL and determine ROs in the first initial UL BWP on NUL. PRB 0 is the PRB0 of the first initial UL BWP on NUL.

If rach-OccasionsSI is absent in si-RequestConfig:
The UE may use the corresponding parameters (e.g. RACH occasions) configured in rach-ConfigCommon IE of the first initial uplink BWP on NUL. Parameters prach-ConfigurationIndex, msg1-FDM and msg1-FrequencyStart in rach-ConfigCommon of the first initial UL BWP on NUL may be used by the UE to determine RACH Occasions on the first initial uplink BWP on NUL. The RACH occasions to be used for requesting a specific SI message, from the RACH Occasions configured by rach-ConfigCommon of the first initial UL BWP on NUL, may be further indicated by si-RequestResources IE in si-RequestConfig IE.

In an embodiment, the si-RequestConfig IE includes si-RequestPeriod and si-RequestResources. The si-RequestPeriod indicates periodicity of the SI-Request configuration in number of association periods. si-RequestResources is a list of SI request resources for requesting SI messages which are not periodically broadcasted. If there is only one entry in the list, the configuration is used for all SI messages for which si-BroadcastStatus is set to notBroadcasting. Otherwise the $1^{st}$ entry in the list corresponds to the first SI message in schedulingInfoList for which si-BroadcastStatus is set to notBroadcasting, $2^{nd}$ entry in the list corresponds to the second SI message in schedulingInfoList for which si-BroadcastStatus is set to notBroadcasting and so on.

Each entry in the list includes ra-PreambleStartIndex, ra-AssociationPeriodIndex, ra-ssb-OccasionMaskIndex. ra-AssociationPeriodIndex is the index of the association period in the si-RequestPeriod in which the UE may send the SI request for SI message(s) corresponding to this SI-RequestResources, using the preambles indicated by ra-PreambleStartIndex and rach occasions indicated by ra-ssb-OccasionMaskIndex. ra-ssb-OccasionMaskIndex indicates subset of RACH occasions from the RACH occasions indicated by rach-OccasionsSI or common RACH configuration (if rach-OccasionsSI is not configured) to be used for requesting a SI message. If N SSBs are associated with a RACH occasion, where N>=1, for the i-th SSB (i=0, . . . , N−1) the preamble with preamble index=ra-PreambleStartIndex+i is used for SI request; For N<1, the preamble with preamble index=ra-PreambleStartIndex is used for SI request.

In an embodiment, the si-RequestConfigSUL IE in SIB1 may indicate SI request RACH resources for the first initial UL BWP on SUL for both redcap and non-redcap UEs. The redcap UE may use this only when second initial UL BWP on SUL is not configured.

In an embodiment, the si-RequestConfigSUL IE may optionally include rach-OccasionsSI. The rach-OccasionsSI may include configuration of dedicated RACH Occasions for SI request for the first initial UL BWP on SUL. The RACH occasions from these dedicated RACH Occasions for SI request to be used for requesting a specific SI message may be further indicated by si-RequestResources IE in si-RequestConfigSUL IE.

The rach-OccasionsSI in si-RequestConfigSUL may include prach-ConfigurationIndex, msg1-FDM and msg1-FrequencyStart. These may be used by both the redcap and the non-redcap UE to determine dedicated RACH Occasions for SI request for the first initial UL BWP on SUL. The prach-ConfigurationIndex indicates the time instances of PRACH transmission occasions. The msg1-FDM indicates the number of PRACH transmission occasions FDMed in one-time instance. The msg1-FrequencyStart is the offset of lowest PRACH transmission occasion in frequency domain with respective to PRB 0.

The UE may apply parameters prach-ConfigurationIndex, msg1-FDM and msg1-FrequencyStart in rach-OccasionsSI in si-RequestConfigSUL to the first initial UL BWP on SUL and determine Ros in the first initial UL BWP on SUL. PRB 0 is the PRB0 of the first initial UL BWP on SUL.

If rach-OccasionsSI is Absent in si-RequestConfigSUL:
The UE may use the corresponding parameters (e.g. RACH occasions) configured in rach-ConfigCommon of the first initial uplink BWP on SUL. Parameters prach-ConfigurationIndex, msg1-FDM and msg1-FrequencyStart in rach-ConfigCommon of the first initial UL BWP on SUL may be used by the UE to determine RACH Occasions on the first initial uplink BWP on SUL. The RACH occasions to be used for requesting a specific SI message, from the RACH Occasions configured by rach-ConfigCommon of the first initial UL BWP on SUL, may be further indicated by si-RequestResources IE in si-RequestConfigSUL IE.

In an embodiment, the si-RequestConfigSUL IE may include si-RequestPeriod and si-RequestResources. The si-RequestPeriod indicates periodicity of the SI-Request configuration in number of association periods. The si-RequestResources is a list of SI request resources for requesting SI messages which are not periodically broadcasted. If there is only one entry in the list, the configuration is used for all SI messages for which si-BroadcastStatus is set to notBroadcasting. Otherwise the $1^{st}$ entry in the list corresponds to the first SI message in schedulingInfoList for which si-BroadcastStatus is set to notBroadcasting, $2^{nd}$ entry in the list corresponds to the second SI message in schedulingInfoList for which si-BroadcastStatus is set to notBroadcasting and so on.

Each entry in the list includes ra-PreambleStartIndex, ra-AssociationPeriodIndex, ra-ssb-OccasionMaskIndex. Ra-AssociationPeriodIndex is the index of the association period in the si-RequestPeriod in which the UE may send the SI request for SI message(s) corresponding to this SI- RequestResources, using the preambles indicated by ra-PreambleStartIndex and rach occasions indicated by ra-ssb-OccasionMaskIndex. Ra-ssb-OccasionMaskIndex indicates subset of RACH occasions from the RACH occasions indicated by rach-OccasionsSI or common RACH configuration (if rach-OccasionsSI is not configured) to be used for requesting a SI message. If N SSBs are associated with a RACH occasion, where N>=1, for the i-th SSB (i=0, ..., N-1) the preamble with preamble index=ra-PreambleStartIndex+i is used for SI request; For N<1, the preamble with preamble index=ra-PreambleStartIndex is used for SI request for any SSB. The UE selects an SSB and then select a preamble corresponding to selected SSB from the preambles indicates by ra-PreambleStartIndex corresponding to the SI message that the UE needs to request.

Selection Between Msg1 or Msg3 Based SI Request:

If a UE is a REDCAP UE and if SIB1 includes si-RequestConfigRedcapSUL and criteria to select SUL is met and if the second initial UL BWP on SUL is configured (or if a UE is a REDCAP UE and if SIB1 includes si-RequestConfigRedcapSUL and criteria to select SUL is met):

The UE may initiate transmission of SI request based on Msg1 based SI request on the second initial UL BWP of SUL. RA procedure on the second initial UL BWP of SUL may be based on si-RequestConfigRedcapSUL. The UE, for example, may initiate RA procedure on the second initial UL BWP of SUL using the PRACH preamble(s) and PRACH resource(s) in si-RequestConfigRedcapSUL corresponding to the SI message(s) that the UE requires to operate within the cell, and for which si-BroadcastStatus is set to notBroadcasting.

Else if the UE is a REDCAP UE and if SIB1 includes si-RequestConfigRedcap and criteria to select NUL is met and if the second initial UL BWP on NUL is configured (or if the UE is a REDCAP UE and if SIB1 includes si-RequestConfigRedcap and criteria to select NUL is met):

The UE may initiate transmission of SI request based on Msg1 based SI request on the second initial UL BWP of NUL. RA procedure on the second initial UL BWP of NUL may be based on si-RequestConfigRedcap. The UE, for example, may initiate RA procedure on the second initial UL BWP of NUL using the PRACH preamble(s) and PRACH resource(s) in si-RequestConfigRedcap corresponding to the SI message(s) that the UE requires to operate within the cell, and for which si-BroadcastStatus is set to notBroadcasting.

Else if the UE is a REDCAP UE and if SIB1 includes si-RequestConfigSUL and criteria to select SUL is met and if the second initial UL BWP on SUL is not configured; or if the UE is a non-REDCAP UE and if SIB1 includes si-RequestConfigSUL and criteria to select SUL is met:

The UE may initiate transmission of SI request based on Msg1 based SI request on the first initial UL BWP of SUL. RA procedure on the first initial UL BWP of SUL may be based on si-RequestConfigSUL. The UE, for example, may initiate RA procedure on the first initial UL BWP of SUL using the PRACH preamble(s) and PRACH resource(s) in si-RequestConfigSUL corresponding to the SI message(s) that the UE requires to operate within the cell, and for which si-BroadcastStatus is set to notBroadcasting.

Else if the UE is a REDCAP UE and if SIB1 includes si-RequestConfig and criteria to select NUL is met and if the second initial UL BWP on NUL is not configured; or if the UE is a non REDCAP UE and if SIB1 includes si-RequestConfig and criteria to select NUL is met:

The UE may initiate transmission of SI request based on Msg1 based SI request on the first initial UL BWP of NUL. RA procedure on the first initial UL BWP of NUL may be based on si-RequestConfig. The UE, for example, may initiate RA procedure on the first initial UL BWP of NUL using the PRACH preamble(s) and PRACH resource(s) in si-RequestConfig corresponding to the SI message(s) that the UE requires to operate within the cell, and for which si-BroadcastStatus is set to notBroadcasting.

Else,

The UE may initiate transmission of the RRCSystemInfoRequest message. In other words, the UE may initiate transmission of SI request based on Msg3.

The redcap UE may use common RACH resources of the second initial UL BWP of selected UL carrier. If second initial UL BWP is not configured on selected UL carrier, the redcap UE may use the common RACH resources of the first initial uplink BWP selected of UL carrier.

The non redcap UE may use common RACH resources of the first initial UL BWP of selected UL carrier.

In an embodiment, SUL may be selected if SUL is configured and RSRP derived from SSB measurements of camped cell or serving cell<rsrp-ThresholdSSB-SUL, where rsrp-ThresholdSSB-SUL is signaled by gNB (e.g. in broadcast signaling such as SIB1). NUL may be selected if SUL is supported in camped cell and RSRP derived from SSB measurements of camped or serving cell>=rsrp-ThresholdSSB-SUL; OR NUL may be selected if SUL is not supported in serving cell.

In an embodiment, if the first and second initial DL BWPs are configured in a cell, upon initiating random access procedure for SI request, the red cap UE may switch to the second initial DL BWP for receiving RAR, if RAR search space is configured on second initial DL BWP. In an embodiment, the switching to second initial DL BWP may be performed only if the UE is using second initial UL BWP for UL transmissions.

Embodiment 3

The UE is in RRC_IDLE state or RRC_INACTIVE state.

The UE is camped on a cell (also referred as PCell).

The cell may be configured with a first initial UL BWP and a second initial UL BWP on an UL carrier. The cell may be configured with one UL carrier i.e. a NUL carrier or cell may be configured with two UL carriers i.e. a NUL carrier and a SUL carrier. The UE may be configured with the first initial UL BWP and/or the second initial UL BWP on the NUL carrier. Alternatively, the UE may be configured with the first initial UL BWP and/or the second initial UL BWP on the SUL carrier.

The first initial UL BWP may be for non-redcap UEs (UEs other than the reduced capability UEs). The second initial UL BWP may be for redcap UEs (reduced capability UEs). BWP configuration of the first initial UL BWP and the second initial UL BWP of UL carrier may be signaled in system information (e.g. in SIB1).

The SIB1 transmitted in the camped cell may include si-RequestConfig and/or si-RequestConfigSUL IEs.

The SIB1 transmitted in the camped cell may include si-RequestConfigRedcap and/or si-RequestConfigRedcapSUL IEs.

The si-RequestConfig and/or the si-RequestConfigSUL in SIB1 may indicate SI request resources for non-redcap UEs.

The si-RequestConfigRedcap and/or si-RequestConfigRedcapSUL IEs in SIB1 may indicate SI request resources for redcap UEs.

The si-RequestConfigRedcap IE in SIB1 may indicate SI request RACH resources on NUL. It may be only used by redcap UEs.

The si-RequestConfigRedcap IE may optionally include rach-OccasionsSI. The rach-OccasionsSI includes a configuration of dedicated RACH Occasions for SI request on NUL. The RACH occasions from these dedicated RACH Occasions for SI request to be used for requesting a specific SI message may be further indicated by si-RequestResources IE in si-RequestConfigRedcap IE.

The rach-OccasionsSI in si-RequestConfigRedcap may include prach-ConfigurationIndex, msg1-FDM and msg1-FrequencyStart which are used by the redcap UE to determine dedicated RACH Occasions for SI request on NUL. The prach-ConfigurationIndex indicates the time instances of PRACH transmission occasions. The msg1-FDM indicates the number of PRACH transmission occasions FDMed in one-time instance. The msg1-FrequencyStart is the offset of lowest PRACH transmission occasion in frequency domain with respective to PRB 0.

If a UE is a redcap UE and second initial UL BWP on NUL is configured, the UE may apply parameters prach-ConfigurationIndex, msg1-FDM and msg1-FrequencyStart in rach-OccasionsSI in si-RequestConfigRedcap to the second initial UL BWP on NUL and determine ROs in second initial UL BWP on NUL. PRB 0 is the PRB0 of the second initial UL BWP on NUL.

If a UE is a redcap UE and second initial UL BWP on NUL is not configured, the UE may apply parameters prach-ConfigurationIndex, msg1-FDM and msg1-FrequencyStart in rach-OccasionsSI in si-RequestConfigRedcap to the first initial UL BWP on NUL and determine ROs in the first initial UL BWP on NUL. PRB 0 is the PRB0 of the first initial UL BWP on NUL.

If rach-OccasionsSI is absent in si-RequestConfigRedcap:
  If the second initial UL BWP on NUL is configured, the redcap UE may use the corresponding parameters (e.g. RACH occasions) configured in rach-ConfigCommon IE of the second initial UL BWP on NUL. Parameters prach-ConfigurationIndex, msg1-FDM and msg1-FrequencyStart in rach-ConfigCommon of the second initial UL BWP on NUL may be used by the UE to determine RACH Occasions of the second initial uplink BWP on NUL. The RACH occasions to be used for requesting a specific SI message, from the RACH Occasions configured by rach-ConfigCommon of the second initial UL BWP on NUL, may be further indicated by si-RequestResources IE in si-RequestConfigRedcap IE.
  the redcap UE may use the corresponding parameters (e.g. RACH occasions) configured in rach-ConfigCommon IE of the first initial UL BWP on NUL, if second initial UL BWP on NUL is not configured. Parameters prach-ConfigurationIndex, msg1-FDM and msg1-FrequencyStart in rach-ConfigCommon of the first initial UL BWP on NUL may be used by the UE to determine RACH Occasions on first initial uplink BWP on NUL. The RACH occasions to be used for requesting a specific SI message, from the RACH Occasions configured by rach-ConfigCommon of the first initial UL BWP on NUL, may be further indicated by si-RequestResources IE in si-RequestConfigRedcap IE.

In an embodiment, the si-RequestConfigRedcapSUL IE in SIB1 may indicate SI request RACH resources on SUL. It may be only used by redcap UEs.

In an embodiment, the si-RequestConfigRedcapSUL IE may optionally include rach-OccasionsSI. The rach-OccasionsSI may include a configuration of dedicated RACH Occasions for SI request on SUL. The RACH occasions from these dedicated RACH Occasions for SI request to be used for requesting a specific SI message may be further indicated by si-RequestResources IE in si-RequestConfigRedcapSUL IE.

In an embodiment, the rach-OccasionsSI in si-RequestConfigRedcapSUL may include prach-ConfigurationIndex, msg1-FDM and msg1-FrequencyStart which are used by the redcap UE to determine dedicated RACH Occasions for SI request on SUL. The prach-ConfigurationIndex indicates the time instances of PRACH transmission occasions. The msg1-FDM indicates the number of PRACH transmission occasions FDMed in one-time instance. The msg1-FrequencyStart is the offset of lowest PRACH transmission occasion in frequency domain with respective to PRB 0.

If a UE is a redcap UE and the second initial UL BWP on SUL is configured, the UE may apply parameters prach-ConfigurationIndex, msg1-FDM and msg1-FrequencyStart in rach-OccasionsSI in si-RequestConfigRedcapSUL to the second initial UL BWP on SUL and determine ROs in second initial UL BWP on SUL. PRB 0 is the PRB 0 of the second initial UL BWP on SUL.

If a UE is a redcap UE and the second initial UL BWP on SUL is not configured, the UE may apply parameters prach-ConfigurationIndex, msg1-FDM and msg1-FrequencyStart in rach-OccasionsSI in si-RequestConfigRedcapSUL to the first initial UL BWP on SUL and determine ROs in the first initial UL BWP on SUL. PRB 0 is the PRB 0 of the first initial UL BWP on SUL.

If rach-OccasionsSI is Absent in si-RequestConfigRedcapSUL:
  If second initial UL BWP on SUL is configured, the redcap UE may use the corresponding parameters (e.g. RACH occasions) configured in rach-ConfigCommon of the second initial UL BWP on SUL. Parameters prach-ConfigurationIndex, msg1-FDM and msg1-FrequencyStart in rach-ConfigCommon of the second initial UL BWP on SUL may be used by the UE to determine RACH Occasions of second initial uplink BWP on SUL. The RACH occasions to be used for requesting a specific SI message, from the RACH Occasions configured by rach-ConfigCommon of the second initial UL BWP on SUL, may be further indicated by si-RequestResources IE in si-RequestConfigRedcapSUL IE.
  the redcap UE may use the corresponding parameters (e.g. RACH occasions) configured in rach-ConfigCommon of the first initial UL BWP on SUL, if the second initial UL BWP on SUL is not configured. Parameters prach-ConfigurationIndex, msg1-FDM and msg1-FrequencyStart in rach-ConfigCommon of the first initial UL BWP on SUL may be used by the UE to determine RACH Occasions on the first initial uplink BWP on SUL. The RACH occasions to be used for requesting a specific SI message, from the RACH Occasions configured by rach-ConfigCommon of the first initial UL BWP on SUL, may be further indicated by si-RequestResources IE in si-RequestConfigRedcapSUL IE.

The si-RequestConfig IE in SIB1 indicates SI request RACH resources for the first initial UL BWP on NUL for non-redcap UEs.

The si-RequestConfig IE may optionally include rach-OccasionsSI. rach-OccasionsSI may include a configuration of dedicated RACH Occasions for SI request for the first initial UL BWP on NUL. The RACH occasions from these dedicated RACH Occasions for SI request to be used for requesting a specific SI message may be further indicated by si-RequestResources IE in si-RequestConfig IE.

The rach-OccasionsSI in si-RequestConfig may include prach-ConfigurationIndex, msg1-FDM and msg1-FrequencyStart which may be used by both the redcap UE and the non-redcap UE to determine dedicated RACH Occasions for SI request for the first initial UL BWP on NUL. The prach-ConfigurationIndex indicates the time instances of PRACH transmission occasions. The msg1-FDM indicates the number of PRACH transmission occasions FDMed in one-time instance. The msg1-FrequencyStart is the offset of lowest PRACH transmission occasion in frequency domain with respective to PRB 0.

Non redcap UEs may apply parameters prach-ConfigurationIndex, msg1-FDM and msg1-FrequencyStart in rach-OccasionsSI to the first initial UL BWP on NUL and determine ROs in the first initial UL BWP on NUL; PRB 0 is the PRB0 of the first initial UL BWP on NUL.

If rach-OccasionsSI is Absent in si-RequestConfig:
The non redcap UE may use the corresponding parameters (e.g. RACH occasions) configured in rach-ConfigCommon IE of the first initial uplink BWP on NUL. Parameters prach-ConfigurationIndex, msg1-FDM and msg1-FrequencyStart in rach-ConfigCommon of the first initial UL BWP on NUL may be used by the UE to determine RACH Occasions on the first initial uplink BWP on NUL. The RACH occasions to be used for requesting a specific SI message, from the RACH Occasions configured by rach-ConfigCommon of the first initial UL BWP on NUL, may be further indicated by si-RequestResources IE in si-RequestConfig IE.

In an embodiment, the si-RequestConfig IE includes si-RequestPeriod and si-RequestResources. The si-RequestPeriod indicates periodicity of the SI-Request configuration in number of association periods. The si-RequestResources is a list of SI request resources for requesting SI messages which are not periodically broadcasted. If there is only one entry in the list, the configuration is used for all SI messages for which si-BroadcastStatus is set to notBroadcasting. Otherwise the 1$^{st}$ entry in the list corresponds to the first SI message in schedulingInfoList for which si-BroadcastStatus is set to notBroadcasting, 2$^{nd}$ entry in the list corresponds to the second SI message in schedulingInfoList for which si-BroadcastStatus is set to notBroadcasting and so on.

Each entry in the list includes ra-PreambleStartIndex, ra-AssociationPeriodIndex, ra-ssb-OccasionMaskIndex. ra-AssociationPeriodIndex is the index of the association period in the si-RequestPeriod in which the UE may send the SI request for SI message(s) corresponding to this SI-RequestResources, using the preambles indicated by ra-PreambleStartIndex and rach occasions indicated by ra-ssb-OccasionMaskIndex. ra-ssb-OccasionMaskIndex indicates subset of RACH occasions from the RACH occasions indicated by rach-OccasionsSI or common RACH configuration (if rach-OccasionsSI is not configured) to be used for requesting a SI message. If N SSBs are associated with a RACH occasion, where N>=1, for the i-th SSB (i=0, . . . , N−1) the preamble with preamble index=ra-PreambleStartIndex+i is used for SI request; For N<1, the preamble with preamble index=ra-PreambleStartIndex is used for SI request.

The si-RequestConfigSUL IE in SIB1 indicates SI request RACH resources for the first initial UL BWP on SUL for non-redcap UEs.

The si-RequestConfigSUL IE may optionally include rach-OccasionsSI. The rach-OccasionsSI includes configuration of dedicated RACH Occasions for SI request for the first initial UL BWP on SUL. The RACH occasions from these dedicated RACH Occasions for SI request to be used for requesting a specific SI message is further indicated by si-RequestResources IE in si-RequestConfigSUL IE.

The rach-OccasionsSI in si-RequestConfigSUL includes prach-ConfigurationIndex, msg1-FDM and msg1-FrequencyStart which is used by both the redcap and the non-redcap UE to determine dedicated RACH Occasions for SI request for the first initial UL BWP on SUL. The prach-ConfigurationIndex indicates the time instances of PRACH transmission occasions. The msg1-FDM indicates the number of PRACH transmission occasions FDMed in one-time instance. The msg1-FrequencyStart is the offset of lowest PRACH transmission occasion in frequency domain with respective to PRB 0.

The non-redcap UE may apply parameters prach-ConfigurationIndex, msg1-FDM and msg1-FrequencyStart in rach-OccasionsSI in si-RequestConfigSUL to the first initial UL BWP on SUL and determines ROs in the first initial UL BWP on SUL. PRB 0 is the PRB0 of the first initial UL BWP on SUL.

If rach-OccasionsSI is Absent in si-RequestConfigSUL:
The non-redcap UE may use the corresponding parameters (e.g. RACH occasions) configured in rach-ConfigCommon of the first initial uplink BWP on SUL. Parameters prach-ConfigurationIndex, msg1-FDM and msg1-FrequencyStart in rach-ConfigCommon of the first initial UL BWP on SUL may be used by the UE to determine RACH Occasions on first initial uplink BWP on SUL. The RACH occasions to be used for requesting a specific SI message, from the RACH Occasions configured by rach-ConfigCommon of the first initial UL BWP on SUL, may be further indicated by si-RequestResources IE in si-RequestConfigSUL IE.

The si-RequestConfigSUL IE includes si-RequestPeriod and si-RequestResources. The si-RequestPeriod indicates periodicity of the SI-Request configuration in number of association periods. The si-RequestResources is a list of SI request resources for requesting SI messages which are not periodically broadcasted. If there is only one entry in the list, the configuration is used for all SI messages for which si-BroadcastStatus is set to notBroadcasting. Otherwise the 1$^{st}$ entry in the list corresponds to the first SI message in schedulingInfoList for which si-BroadcastStatus is set to notBroadcasting, 2$^{nd}$ entry in the list corresponds to the second SI message in schedulingInfoList for which si-BroadcastStatus is set to notBroadcasting and so on.

Each entry in the list includes ra-PreambleStartIndex, ra-AssociationPeriodIndex, ra-ssb-OccasionMaskIndex. ra-AssociationPeriodIndex is the index of the association period in the si-RequestPeriod in which the UE may send the SI request for SI message(s) corresponding to this SI-RequestResources, using the preambles indicated by ra-PreambleStartIndex and rach occasions indicated by ra-ssb-OccasionMaskIndex. ra-ssb-OccasionMaskIndex indicates subset of RACH occasions from the RACH occasions indicated by rach-OccasionsSI or common RACH configuration (if rach-OccasionsSI is not configured) to be used for requesting a SI message. If N SSBs are associated with a RACH occasion, where N>=1, for the i-th SSB (i=0, . . . , N−1) the preamble with preamble index=ra-PreambleStartIndex+i is used for SI request; For N<1, the preamble with preamble index=ra-PreambleStartIndex is used for SI request for any SSB. The UE selects an SSB and then select a preamble corresponding to selected SSB from the preambles indicates by ra-PreambleStartIndex corresponding to the SI message that the UE needs to request.

Selection between Msg1 or Msg3 based SI Request:
- If a UE is a REDCAP UE and if SIB1 includes si-RequestConfigRedcapSUL and criteria to select SUL is met:
  - If a second initial UL BWP of SUL is configured, RA procedure may be initiated on the second initial UL BWP of SUL using si-RequestConfigRedcapSUL. If the second initial UL BWP is not configured, RA procedure may be initiated on a first initial UL BWP of SUL using si-RequestConfigRedcapSUL.
  - For example, if the second initial UL BWP of SUL is configured, the UE may initiate transmission of SI request based on Msg1 based SI request on the second initial UL BWP on SUL. In other words, the UE may initiate RA procedure on the second initial UL BWP of SUL using the PRACH preamble(s) and PRACH resource(s) in si-RequestConfigRedcapSUL corresponding to the SI message(s) that the UE requires to operate within the cell, and for which si-BroadcastStatus is set to notBroadcasting.
  - If the second initial UL BWP of SUL is not configured, the UE may initiate transmission of SI request based on Msg1 based SI request on the first initial UL BWP on SUL. If second initial UL BWP of SUL is not configured, the UE may initiate RA procedure on first initial UL BWP of SUL using the PRACH preamble(s) and PRACH resource(s) in si-RequestConfigRedcapSUL corresponding to the SI message(s) that the UE requires to operate within the cell, and for which si-BroadcastStatus is set to notBroadcasting.
- Else if the UE is a REDCAP UE and if SIB1 includes si-RequestConfigRedcap and criteria to select NUL is met:
  - If a second initial UL BWP of NUL is configured, RA procedure may be initiated on the second initial UL BWP of NUL using si-RequestConfigRedcap. If second initial UL BWP is not configured, RA procedure may be initiated on a first initial UL BWP of NUL using si-RequestConfigRedcap.
  - For example, if second initial UL BWP of NUL is configured, the UE may initiate transmission of SI request based on Msg1 based SI request on the second initial UL BWP on NUL. The UE may initiate RA procedure on second initial UL BWP of NUL using the PRACH preamble(s) and PRACH resource(s) in si-RequestConfigRedcap corresponding to the SI message(s) that the UE requires to operate within the cell, and for which si-BroadcastStatus is set to notBroadcasting.
  - If the second initial UL BWP of NUL is not configured, the UE may initiate transmission of SI request based on Msg1 based SI request on the first initial UL BWP on NUL. If second initial UL BWP of NUL is not configured, the UE may initiate RA procedure on first initial UL BWP of NUL using the PRACH preamble(s) and PRACH resource(s) in si-RequestConfigRedcap corresponding to the SI message(s) that the UE requires to operate within the cell, and for which si-BroadcastStatus is set to notBroadcasting.
- Else if the UE is a REDCAP UE:
  - The UE may initiate transmission of SI request based on Msg3 based SI request. In other words, the UE may initiate transmission of the RRCSystemInfoRequest message.
  - The redcap UE may use common RACH resources of the of second initial UL BWP of selected UL carrier, if second initial UL BWP is configured on selected UL carrier. If second initial UL BWP is not configured on selected UL carrier, the redcap UE may use the common RACH resources of the first initial uplink BWP selected UL carrier.
- Else
- If SI request configuration is signaled by gNB for the first initial UL BWP on SUL, and criteria to select SUL is met (i.e. SUL is configured and RSRP derived from SSB measurements of camped or serving cell<rsrp-ThresholdSSB-SUL, where rsrp-ThresholdSSB-SUL is signaled by gNB (e.g. in broadcast signaling such as SIB1)): the UE may initiate transmission of SI request based on Msg1 based SI request on the first initial UL BWP on SUL. In other words, the UE may initiate Random Access procedure using the PRACH preamble(s) and PRACH resource(s) in si-RequestConfigSUL corresponding to the SI message(s) that the UE requires to operate within the cell, and for which si-BroadcastStatus is set to notBroadcasting. During the random access procedure, the UE may transmit and receive on first initial uplink BWP on SUL and first initial downlink BWP respectively. The UE may transmit Msg1 (i.e. Random access preamble) and wait for acknowledgement for SI request. Random access resources (PRACH preamble(s) and PRACH occasions(s)) indicated in si-RequestConfigSUL is used for Msg1. Msg1 is transmitted on SUL. If acknowledgement for SI request is received, the UE may monitor the SI window of the requested SI message in one or more SI period(s) of that SI message.
- Else if SI request configuration is signaled by gNB for initial UL BWP on NUL and criteria to select NUL is met (i.e. NUL is selected if SUL is supported in camped or serving cell and RSRP derived from SSB measurements of camped or serving cell>=rsrp-ThresholdSSB-SUL; OR NUL is selected if SUL is not supported in serving cell): the UE may initiate transmission of SI request based on Msg1 based SI request on NUL. In other words, the UE may initiate Random Access procedure using the PRACH preamble(s) and PRACH resource(s) in si-RequestConfig corresponding to the SI message(s) that the UE requires to operate within the cell, and for which si-BroadcastStatus is set to notBroadcasting. During the random access procedure, the UE may transmit and receive on initial uplink BWP on NUL and initial downlink BWP respectively. The UE may transmit Msg1 (i.e. Random access preamble) and wait for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, the UE may monitor the SI window of the requested SI message in one or more SI period(s) of that SI message.
- Else, the UE may initiate transmission of SI request based on Msg3 based SI request. In other words, the UE may initiate transmission of RRCSystemInfoRequest message. The UE may transmit Msg1 (i.e. Random access preamble) and wait for random access response. Common random access resources (PRACH preamble(s) and PRACH occasions(s)) are used for Msg1 on the selected UL carrier. In the UL grant received in random access response, the UE may transmit RRCSystemInfoRequest message and wait for acknowledgement for SI request (i.e. RRCSystemInfoRequest message). If acknowledgement for SI request (i.e. RRCSystemInfoRequest message) is received, the UE may monitor the SI window of the requested SI message in one or more SI period(s) of that SI message. Note that if SUL is configured, UL carrier for Msg1 transmission will be selected by the UE in similar mariner as selected by the UE for Msg1 based SI request. SUL is the selected UL carrier, if RSRP derived from SSB measurements of camped or serving cell<rsrp-ThresholdSSB-SUL where rsrp-ThresholdSSB-SUL is signaled by gNB (e.g. in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by gNB (e.g. in broadcast signaling such as SIB1).

In this embodiment, SUL may be selected if SUL is configured and RSRP derived from SSB measurements of camped or serving cell<rsrp-ThresholdSSB-SUL, where rsrp-ThresholdSSB-SUL is signaled by gNB (e.g. in broadcast signaling such as SIB1). NUL is selected if SUL is supported in camped cell and RSRP derived from SSB measurements of camped or serving cell>=rsrp-ThresholdSSB-SUL; OR NUL is selected if SUL is not supported in serving cell.

In an embodiment, if first and second initial DL BWPs are configured in a cell, upon initiating random access procedure for SI request, the red cap UE may switch to second initial DL BWP for receiving RAR, if RAR search space is configured on second initial DL BWP. In an embodiment, the switching to second initial DL BWP may be performed only if the UE is using second initial UL BWP for UL transmissions.

Figure 3:
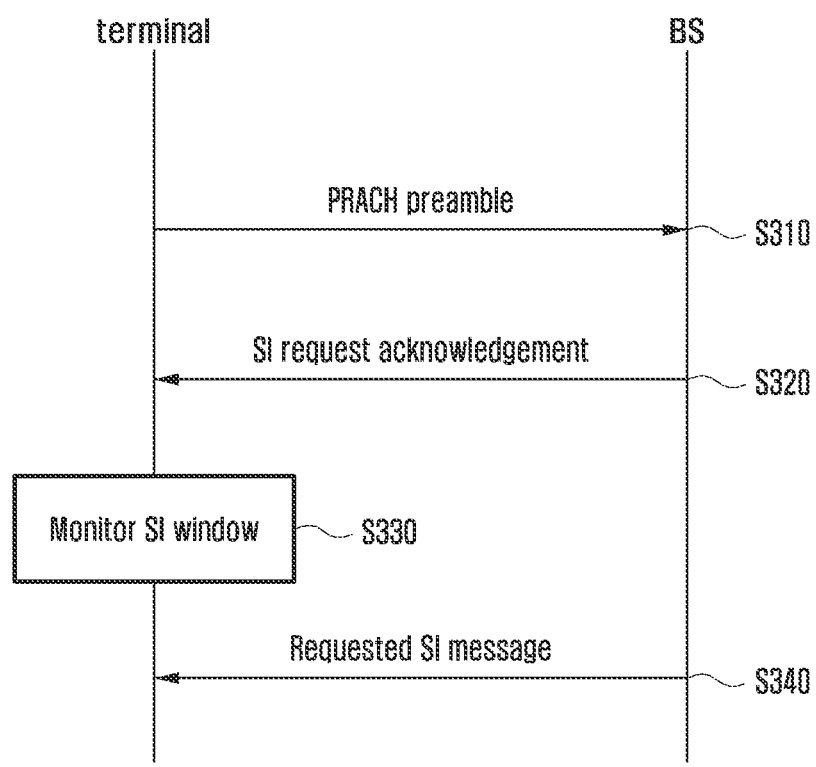
FIG. 3 illustrates an example of a flowchart for requesting system information according to an embodiment of the disclosure.

FIG. 3 illustrates an example of a flowchart for requesting system information according to an embodiment of the disclosure. Referring to FIG. 3, embodiment 4 and embodiment 5 of the disclosure will be described.

Embodiment 4

A cell may be configured with a first initial UL BWP and a second initial UL BWP on an UL carrier. The UE may be configured with the first initial UL BWP and/or the second initial UL BWP on a NUL carrier. The UE may be configured with the first initial UL BWP and/or the second initial UL BWP on a SUL carrier.

The first initial UL BWP may be for non-redcap UEs, and the second initial UL BWP may be for redcap UEs.

The cell may be also configured with a first initial DL BWP and a second initial DL BWP on a DL carrier.

Random access procedure may be initiated for SI request in RRC IDLE/RRC_INACTIVE.

The redcap UE may transmit a PRACH preamble on the second initial UL BWP using PRACH resources of the second initial UL BWP corresponding to SI message which the UE wants to request at operation S310.

The redcap UE may receive SI request acknowledgement on the second initial DL BWP at operation S320.

If the second initial DL BWP is configured with other system information (OSI) search space, the redcap UE may monitor a SI window of requested SI message(s) on the second initial DL BWP at operation S330;

Else if the second initial DL BWP is not configured with OSI search space, the redcap UE may switch to the first initial DL BWP and the redcap UE may monitor the SI window of requested SI message(s) on the first initial DL BWP.

The redcap UE may receive the requested SI message at operation S340.

Embodiment 5

A cell may be configured with a first initial UL BWP and a second initial UL BWP on an UL carrier. The UE may be configured with the first initial UL BWP and/or the second initial UL BWP on a NUL carrier. The UE may be configured with the first initial UL BWP and/or the second initial UL BWP on a SUL carrier.

The first initial UL BWP may be for non-redcap UEs, and the second initial UL BWP may be for redcap UEs.

The cell may be also configured with a first initial DL BWP and a second initial DL BWP on a DL carrier.

Random access procedure may be initiated for SI request in RRC IDLE/RRC_INACTIVE.

The redcap UE may transmit a PRACH preamble on an active UL BWP using PRACH resources of the active UL BWP corresponding to SI message which the UE wants to request at operation S310.

The redcap UE may receive SI request acknowledgement on an active DL BWP at operation S320.

The redcap UE may receive requested SI as follows at operations S330, S340:

If the active DL BWP is the first initial UL BWP, the redcap UE may monitor a SI window of requested SI message(s) on the active DL BWP;

Else if the active DL BWP is configured with OSI search space, the redcap UE may monitor the SI window of requested SI message(s) on the active DL BWP;

Else, the redcap UE may switch to the first initial DL BWP, and the redcap UE may monitor the SI window of requested SI message(s) on the first initial DL BWP.

Figure 4:
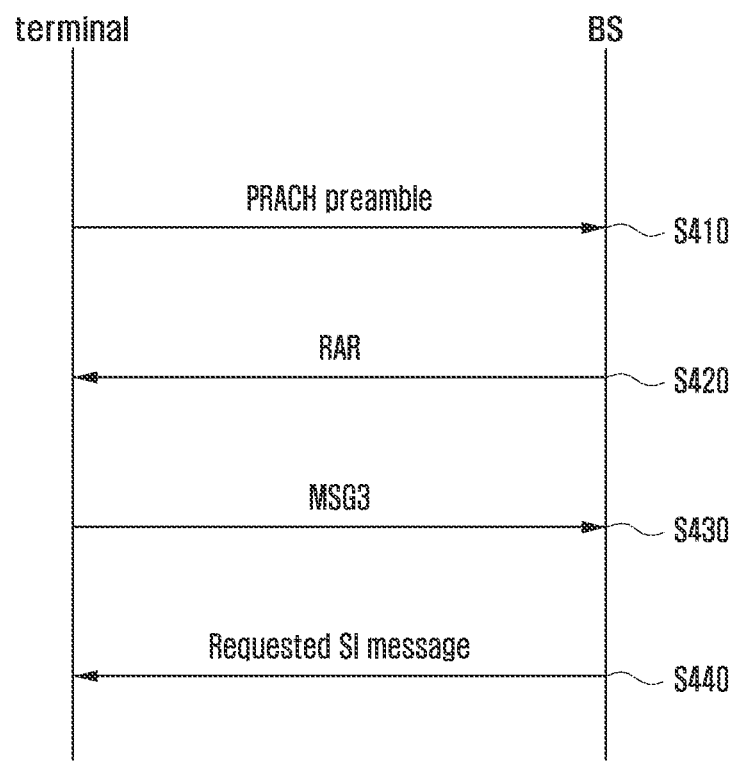
FIG. 4 illustrates an example of a flowchart for requesting system information according to an embodiment of the disclosure.

FIG. 4 illustrates an example of a flowchart for requesting system information according to an embodiment of the disclosure. Referring to FIG. 4, embodiment 6 and embodiment 7 of the disclosure will be described.

Embodiment 6

A cell may be configured with a first initial UL BWP and a second initial UL BWP on an UL carrier. The UE may be configured with the first initial UL BWP and/or the second initial UL BWP on a NUL carrier. The UE may be configured with the first initial UL BWP and/or the second initial UL BWP on a SUL carrier.

The first initial UL BWP may be for non-redcap UEs, and the second initial UL BWP may be for redcap UEs.

The cell may be also configured with a first initial DL BWP and a second initial DL BWP on a DL carrier.

Random access procedure may be initiated for RRC System information request.

The redcap UE may transmit a PRACH preamble on the second initial UL BWP using PRACH resources of the second initial UL BWP at operation S410.

The redcap UE may receive RAR at operation S420.

The redcap UE may transmit Msg3 including common control channel (CCCH) service data unit (SDU) i.e. RRC System information request on the second initial UL BWP at operation S430.

The redcap UE may receive contention resolution MAC CE including 48 bits of transmitted CCCH SDU. The redcap UE may receive requested SI as follows at operation S440:

If the second initial DL BWP is configured with OSI search space, the redcap UE may monitor a SI window of requested SI message(s) on the second initial DL BWP;

Else if the second initial DL BWP is not configured with OSI search space, the redcap UE may switch to the first initial DL BWP and the redcap UE may monitor the SI window of requested SI message(s) on the first initial DL BWP.

If ROs in the second initial UL BWP are same as ROs in the first initial UL BWP and preambles reserved for SI resources are also same, redcap logical channel ID (LCID) should be used in MAC subheader of MAC SDU carrying RRC System information request message transmitted by redcap UE, so that network may identify and send the SI request acknowledgement and requested SI messages for redcap UEs.

Embodiment 7

A cell may be configured with a first initial UL BWP and a second initial UL BWP on an UL carrier. The UE may be configured with the first initial UL BWP and/or the second initial UL BWP on a NUL carrier. The UE may be configured with the first initial UL BWP and/or the second initial UL BWP on a SUL carrier.

The first initial UL BWP may be for non-redcap UEs, and the second initial UL BWP may be for redcap UEs.

The cell may be also configured with a first initial DL BWP and a second initial DL BWP on a DL carrier.

Random access procedure may be initiated for RRC System information request.

The redcap UE may transmit a PRACH preamble on an active UL BWP using PRACH resources of the active UL BWP at operation S410.

The redcap UE may receive RAR at operation S420.

The redcap UE may transmit Msg3 including CCCH SDU i.e. RRC System information request on the second initial UL BWP at operation S430.

The redcap UE may receive contention resolution MAC CE including 48 bits of transmitted CCCH SDU. The redcap UE may receive requested SI as follows at operation S440:

If the active DL BWP is the first initial UL BWP, the redcap UE may monitor a SI window of requested SI message(s) on the active DL BWP;

Else if the active DL BWP is configured with OSI search space, the redcap UE may monitor the SI window of requested SI message(s) on the active DL BWP;

Else, the redcap UE may switch to the first initial DL BWP and the redcap UE may monitor the SI window of requested SI message(s) on the first initial DL BWP.

If ROs in the second initial UL BWP are same as ROs in the first initial UL BWP and preambles reserved for SI resources are also same, redcap LCID should be used in MAC subheader of MAC SDU carrying RRC System information request message transmitted by redcap UE, so that network may identify and send the SI request acknowledgement and requested SI messages for redcap UEs.

Figure 5:
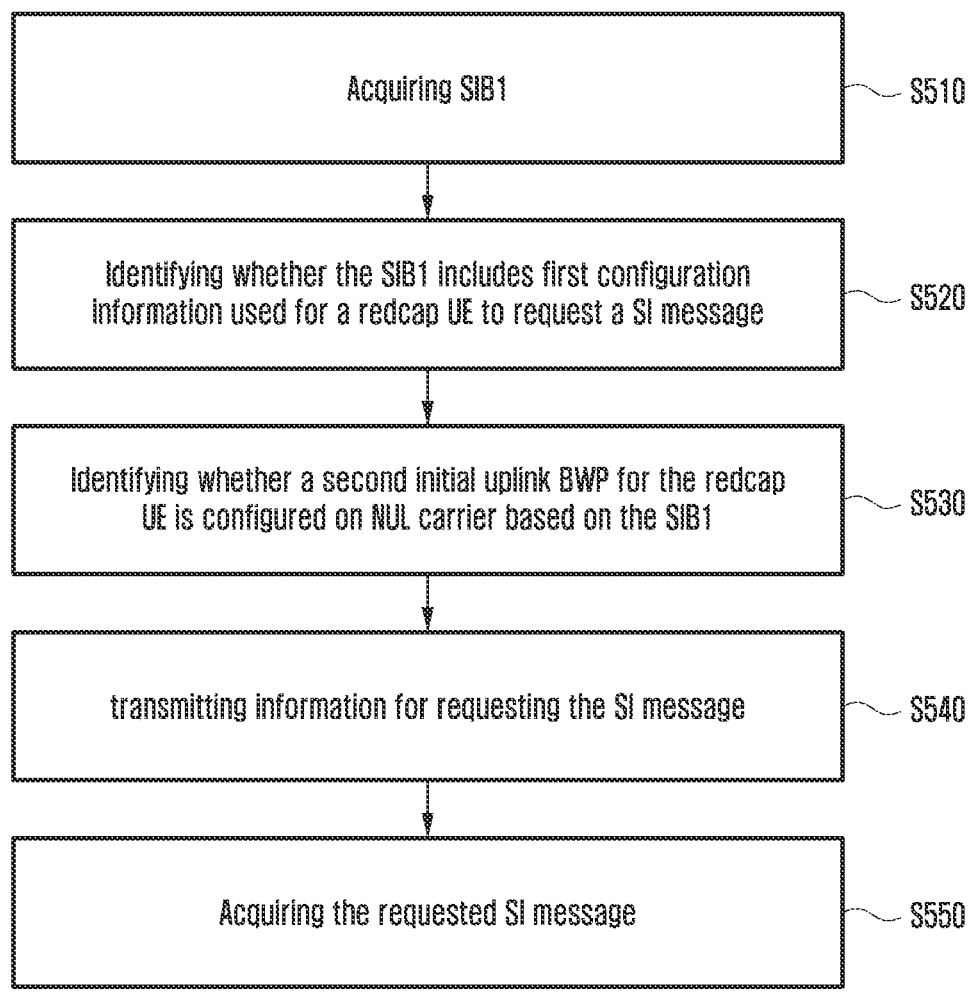
FIG. 5 illustrates an example of a flowchart for requesting system information according to an embodiment of the disclosure.

FIG. 5 illustrates an example of a flowchart for requesting system information according to an embodiment of the disclosure. FIG. 5 is only an example for helping understanding of the disclosure, and does not limit the technical scope of the disclosure.

Operations of FIG. 5 may be performed based on the above-described methods and/or embodiments (e.g., embodiment 1/2/3/4/5/6/7). Referring to FIG. 5, the operation order of may be changed from each other, or two or more operations may be combined and performed as one operation. In addition, in some case, some operations may be omitted.

The UE (e.g., the redcap UE) may acquire a SIB1 at operation S510. A base station may transmit the SIB1 to UE.

The SIB1 may include information on a first initial uplink BWP on a NUL carrier. The SIB1 may include first configuration information used for the redcap UE to request a SI message. The NUL carrier and a SUL carrier are configured for a serving cell of the base station. For another example, the NUL carrier is configured for the serving cell of the base station and the SUL carrier is not configured for the serving cell of the base station.

The UE may identify whether the SIB1 includes first configuration information used for the redcap UE to request a SI message at operation S520.

The UE may identify whether a second initial uplink BWP for the redcap UE is configured on the NUL carrier based on the SIB1 at operation S530. The first initial uplink BWP and the second initial uplink BWP are on the NUL carrier.

The UE may transmit information for requesting the SI message at operation S540.

In a case that the SIB1 includes the first configuration information for the redcap UE, the second initial uplink BWP for the redcap UE is configured on the NUL carrier, and criteria to select the NUL carrier is met, the UE may start a random access procedure for requesting the SI message in the second initial uplink BWP for the redcap UE on the NUL carrier, based on a preamble resource in the first configuration information. In other words, in a case that the SIB1 includes the first configuration information for the redcap UE, the second initial uplink BWP for the redcap UE is configured on the NUL carrier, and criteria to select the NUL carrier is met, the base station may receive a PRACH preamble for requesting the SI message in the second initial uplink BWP for the redcap UE on the NUL carrier. The PRACH preamble may be received based on a preamble resource in the first configuration information.

In a case that the second initial uplink BWP for the redcap UE is not configured on the NUL carrier, the UE may identify whether the SIB1 includes second configuration information for requesting the SI message. In a case that the SIB1 includes the second configuration information and criteria to select the NUL carrier is met, the UE may start a random access procedure for requesting the SI message on the first initial uplink BWP on the NUL carrier, based on a preamble resource in the second configuration information. In other words, in a case that the second initial uplink BWP for the redcap UE is not configured on the NUL carrier, the SIB1 includes second configuration information for requesting the SI message, and criteria to select the NUL carrier is met, the base station may receive the PRACH preamble for requesting the SI message in the first initial uplink BWP on the NUL carrier based on a preamble resource in the second configuration information.

When the NUL carrier and the SUL carrier are configured for the serving cell, if a RSRP measured on the serving cell is greater or equal to a threshold, the criteria to select the NUL carrier is met.

In a case that the SIB1 does not include the first configuration information for the redcap UE and second configuration information for requesting the SI message, and the second initial uplink BWP for the redcap UE is not configured, the UE may transmit the information for requesting the SI message (e.g., a SI request message) based on a message 3. In other words, in a case that the SIB1 does not include the first configuration information for the redcap UE and second configuration information for requesting the SI message, and the second initial uplink BWP for the redcap UE is not configured, the base station may receive a SI request message based on a message 3.

The UE may acquire the requested SI message at operation S550. The base station may transmit the requested SI message to the UE.

Figure 6:
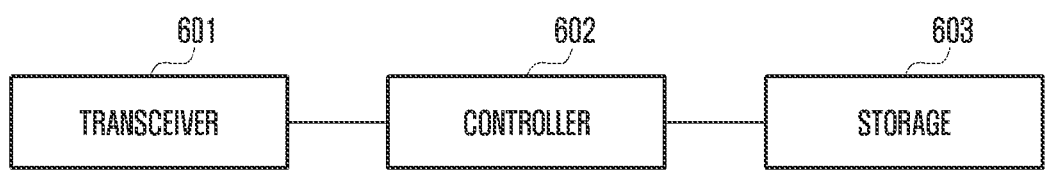
FIG. 6 is a diagram illustrating the structure of a UE according to an embodiment of the disclosure.
Figure 7:
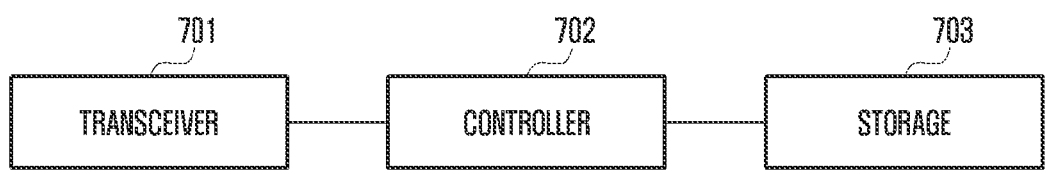
FIG. 7 is a diagram illustrating the structure of a base station according to an embodiment of the disclosure.

The above-described methods and/or embodiments (e.g., embodiment 1/2/3/4/5/6/7) provided in the disclosure may be performed by a UE and/or a base station of FIGS. 6 and 7.

FIG. 6 is a diagram illustrating the structure of a UE according to an embodiment of the disclosure.

Referring to FIG. 6, the UE may include a transceiver 601, a controller 602, and a storage 603. However, the components of the UE are not limited to the above-described examples. The UE may include more or fewer components than the aforementioned components. Further, the transceiver 601, the controller 602, and the storage 603 may be implemented in the form of a single chip. The controller 602 may be defined as a circuit or application-specific integrated circuit or at least one processor.

The transceiver 601 may transmit and receive signals to and from another network entity.

The controller 602 may be configured to control operations of the UE according to methods and/or embodiments (e.g., embodiment 1/2/3/4/5/6/7) of the disclosure. The controller 602 may control signal flow between respective blocks so as to perform an operation according to the above-described drawings and flowcharts. Specifically, the controller 602 may be configured to acquire a SIB1 including information on a first initial uplink BWP for a cell, identify whether the SIB1 includes first configuration information used for the redcap UE to request a SI message, and identify whether a second initial uplink BWP for the redcap UE is configured or not based on the SIB1. The controller 602 may be further configured to start a random access procedure for requesting the SI message on the second initial uplink BWP for the redcap UE based on a preamble resource in the first configuration information, in a case that the SIB1 includes the first configuration information for the redcap UE and the second initial uplink BWP for the redcap UE is configured. The controller 602 may be further configured to acquire the requested SI message.

The storage 603 may be configured to store at least one of information being transmitted and received through the transceiver 601 and information being generated through the controller 602. In an embodiment, the storage comprises one or more memories.

FIG. 7 is a diagram illustrating the structure of a base station according to an embodiment of the disclosure.

Referring to FIG. 7, the base station may include a transceiver 701, a controller 702, and a storage 703. However, the components of the base station are not limited to the above-described examples. The base station may include more or fewer components than the aforementioned components. Further, the transceiver 701, the controller 702, and the storage 703 may be implemented in the form of a single chip. The controller 702 may be defined as a circuit or application-specific integrated circuit or at least one processor. For example, each of MN and SN may correspond to the base station.

The transceiver 701 may transmit and receive signals to and from another network entity.

The controller 702 may be configured to control operations of the base station according to methods and/or embodiments (e.g., embodiment 1/2/3/4/5/6/7) of the disclosure. The controller 702 may control signal flow between respective blocks so as to perform an operation according to the above-described drawings and flowcharts. Specifically, the controller 702 may be configured to transmit a SIB1 including information on a first initial uplink BWP for a cell. The controller 702 may be configured to receive a PRACH preamble for requesting the SI message on the second initial uplink BWP for the redcap UE, in a case that the SIB1 includes first configuration information used for the redcap UE to request a SI message and a second initial uplink BWP for the redcap UE is configured based on the SIB1. The PRACH preamble may be received based on a preamble resource in the first configuration information. The controller 702 may be configured to transmit the requested SI message.

The storage 703 may be configured to store at least one of information being transmitted and received through the transceiver 701 and information being generated through the controller 702. In an embodiment, the storage comprises one or more memories.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a reduced capability user equipment (RedCap UE) in a wireless communication system, the method comprising:
   receiving, from a base station, a system information block 1 (SIB1) including first information on a first initial uplink (UL) bandwidth part (BWP);
   identifying whether second information on a second initial UL BWP for the RedCap UE is configured;
   in response to the second information being configured, the SIB1 including second configuration information on a system information (SI) request for the RedCap UE, and criteria to select a normal uplink (NUL) carrier being met, transmitting, to the base station, a physical random access channel (PRACH) preamble for requesting an SI message on the second initial UL BWP based on the second configuration information;
   in response to the second information not being configured, the SIB1 including first configuration information on the SI, and the criteria to select the NUL carrier being met, transmitting, to the base station, the PRACH preamble for requesting the SI message on the first initial UL BWP based on the first configuration information;

in response to the SIB1 not including the first configuration information, transmitting, to the base station, a radio resource control (RRC) message for requesting the SI message on the first initial UL BWP; and receiving, from the base station, the requested SI message.

2. The method of claim 1, wherein the criteria to select the NUL carrier is met in case that a reference signal received power (RSRP) measured for a downlink (DL) of a serving cell is greater or equal to a threshold.

3. A method performed by a base station in a wireless communication system, the method comprising:

transmitting, to a reduced capability user equipment (RedCap UE), a system information block 1 (SIB1) including first information on a first initial uplink (UL) bandwidth part (BWP);

in response to second information on a second initial UL BWP for the RedCap UE being configured, the SIB1 including second configuration information on a system information (SI) request for the RedCap UE, and criteria to select a normal uplink (NUL) carrier being met, receiving, from the RedCap UE, a physical random access channel (PRACH) preamble for requesting an SI message on the second initial UL BWP based on the second configuration information;

in response to the second information not being configured, the SIB1 including first configuration information on the SI, and the criteria to select the NUL carrier being met, receiving, from the RedCap UE, the PRACH preamble for requesting the SI message on the first initial UL BWP based on the first configuration information;

in response to the SIB1 not including the first configuration information, receiving, from the RedCap UE, a radio resource control (RRC) message for requesting the SI message on the first initial UL BWP; and transmitting, to the RedCap UE, the requested SI message.

4. The method of claim 3, wherein the criteria to select the NUL carrier is met in case that a reference signal received power (RSRP) measured for a downlink (DL) of a serving cell is greater or equal to a threshold.

5. A reduced capability user equipment (RedCap UE) in a wireless communication system, the RedCap UE comprising:

a transceiver configured to transmit and receive signals; and a controller coupled with the transceiver and configured to:

receive, from a base station, a system information block 1 (SIB1) including first information on a first initial uplink (UL) bandwidth part (BWP), identify whether second information on a second initial UL BWP for the RedCap UE is configured, in case that the second information is configured, the SIB1 includes second configuration information on a system information (SI) request for the RedCap UE, and criteria to select a normal uplink (NUL) carrier is met, transmit, to the base station, a physical random access channel (PRACH) preamble for requesting an SI message on the second initial UL BWP based on the second configuration information, in case that the second information is not configured, the SIB1 includes first configuration information on the SI, and the criteria to select the NUL carrier is met, transmit, to the base station, the PRACH preamble for requesting the SI message on the first initial UL BWP based on the first configuration information, in case that the SIB1 does not include the first configuration information, transmit, to the base station, a radio resource control (RRC) message for requesting the SI message on the first initial UL BWP, and receive, from the base station, the requested SI message.

6. The RedCap UE of claim 5, wherein the criteria to select the NUL carrier is met in case that a reference signal received power (RSRP) measured for a downlink of a serving cell is greater or equal to a threshold.

7. A base station in a wireless communication system, the base station comprising:

a transceiver configured to transmit and receive signals; and a controller coupled with the transceiver and configured to:

transmit, to a reduced capability user equipment (RedCap UE), a system information block 1 (SIB1) including first information on a first initial uplink (UL) bandwidth part (BWP), in case that second information on a second initial UL BWP for the RedCap UE is configured, the SIB1 includes second configuration information on a system information (SI) request for the RedCap UE, and criteria to select a normal uplink (NUL) carrier is met, receive, from the RedCap UE, a physical random access channel (PRACH) preamble for requesting an SI message on the second initial UL BWP based on the second configuration information, in case that the second information is not configured, the SIB1 includes first configuration information on the SI, and the criteria to select the NUL carrier is met, receive, from the RedCap UE, the PRACH preamble for requesting the SI message on the first initial UL BWP based on the first configuration information, in case that the SIB1 does not include the first configuration information, receive, from the RedCap UE, a radio resource control (RRC) message for requesting the SI message on the first initial UL BWP, and transmit, to the RedCap UE, the requested SI message.

8. The base station of claim 7, wherein the criteria to select the NUL carrier is met in case that a reference signal received power (RSRP) measured for a downlink of a serving cell is greater or equal to a threshold.

* * * * *